US009059818B2

United States Patent
Chung et al.

(10) Patent No.: US 9,059,818 B2
(45) Date of Patent: Jun. 16, 2015

(54) METHOD AND APPARATUS FOR TRANSMITTING MULTI-USER MIMO REFERENCE SIGNAL IN WIRELESS COMMUNICATION SYSTEM FOR SUPPORTING RELAY

(75) Inventors: Jae Hoon Chung, Anyang-si (KR); Moon Il Lee, Anyang-si (KR); Sung Ho Moon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 13/392,225

(22) PCT Filed: Oct. 18, 2010

(86) PCT No.: PCT/KR2010/007128
§ 371 (c)(1),
(2), (4) Date: Feb. 24, 2012

(87) PCT Pub. No.: WO2011/046413
PCT Pub. Date: Apr. 21, 2011

(65) Prior Publication Data
US 2012/0163335 A1    Jun. 28, 2012

Related U.S. Application Data

(60) Provisional application No. 61/252,173, filed on Oct. 16, 2009.

(51) Int. Cl.
*H04W 4/00*  (2009.01)
*H04L 5/00*  (2006.01)

(52) U.S. Cl.
CPC ............. *H04L 5/0023* (2013.01); *H04L 5/0026* (2013.01); *H04L 5/0028* (2013.01); *H04L 5/0032* (2013.01); *H04L 5/0037* (2013.01); *H04L 5/0051* (2013.01); *H04L 5/0073* (2013.01)

(58) Field of Classification Search
CPC .................................................. H04W 72/0446
USPC ........... 370/329, 330, 203, 315, 436; 375/260
See application file for complete search history.

(56) References Cited

U.S. PATENT DOCUMENTS 8,259,559 B2 *   9/2012   Han et al. ...................... 370/203
2004/0042556 A1   3/2004   Medvedev et al.
(Continued)

FOREIGN PATENT DOCUMENTS

CN   1679269 A     10/2005
CN   101227249 A    7/2008
(Continued)

OTHER PUBLICATIONS

CMCC, "Discussions on DM-RS Design with Rank Grouping", 3GPP TSG RAN WG1 Meeting #57bis, Agenda Item: 15.1, Los Angeles, USA, Jun. 29-Jul. 3, 2009, 4 pages, R1-092823, XP-050597565.

(Continued)

*Primary Examiner* — Chirag Shah
*Assistant Examiner* — Jael Ulysse
(74) *Attorney, Agent, or Firm* — Birch, Stewart, Kolasch & Birch, LLP

(57) ABSTRACT

A wireless communication system, a method, and an apparatus for transmitting a multi-user Multiple Input Multiple Output (MIMO) signal in a wireless communication system for supporting a relay. A method for transmitting a demodulation reference signal (DMRS) for downlink multi-user MIMO transmission, the method including mapping a DMRS for first and second layers on a downlink physical resource block according to first and second DMRS patterns, respectively; and transmitting the downlink physical resource block. In the downlink physical resource block, a resource element corresponding to the second DMRS pattern can be punctured on the first layer and resource element corresponding to the first DMRS pattern can be punctured on the first layer and a resource element corresponding to the first DMRS pattern can be punctured on the second layer.

8 Claims, 18 Drawing Sheets

(56) References Cited

U.S. PATENT DOCUMENTS

| | | | |
|---|---|---|---|
| 2007/0248113 A1* | 10/2007 | Ko et al. | 370/436 |
| 2008/0273491 A1* | 11/2008 | Han et al. | 370/329 |
| 2009/0046793 A1 | 2/2009 | Love et al. | |
| 2010/0034312 A1* | 2/2010 | Muharemovic et al. | 375/267 |
| 2010/0195599 A1* | 8/2010 | Zhang et al. | 370/329 |
| 2010/0303034 A1* | 12/2010 | Chen et al. | 370/329 |
| 2011/0026622 A1* | 2/2011 | Luo et al. | 375/260 |
| 2012/0039287 A1* | 2/2012 | Ko et al. | 370/329 |
| 2013/0064169 A1* | 3/2013 | Song et al. | 370/315 |

FOREIGN PATENT DOCUMENTS

| | | |
|---|---|---|
| KR | 10-2008-0098282 A | 11/2007 |
| KR | 10-2008-0092194 A | 10/2008 |

OTHER PUBLICATIONS

Research in Motion, UK Limited, "Configurations of Transparent Relay using Rel-9 Dual-Layer Beamforming", 3GPP TSG RAN WG1 Meeting #58, Agenda Item: 15.3, Shenzhen, China, Aug. 24-28, 2009, pp. 1-7, R1-093285, XP-050351611.

* cited by examiner (a)

DMRS for UE1     Data for UE1

DMRS for UE2     Data for UE2

(a)

(b)

DMRS for UE1    Data for UE1

DMRS for UE2    Data for UE2

Resource elements to be punctured

METHOD AND APPARATUS FOR TRANSMITTING MULTI-USER MIMO REFERENCE SIGNAL IN WIRELESS COMMUNICATION SYSTEM FOR SUPPORTING RELAY

CROSS REFERENCE TO RELATED PRIOR APPLICATIONS

This application is the National Phase of PCT/KR2010/007128 filed on Oct. 18, 2010, which claims priority under 35 U.S.C. 119(e) to U.S. Provisional Application No. 61/252,173 filed on Oct. 16, 2009, all of which are hereby expressly incorporated by reference into the present application.

TECHNICAL FIELD

The present invention relates to a wireless communication system, and more particularly to a method and an apparatus for transmitting a multi-user Multiple Input Multiple Output (MIMO) reference signal in a wireless communication system for supporting a relay.

BACKGROUND ART

FIG. 1 illustrates a relay node (RN) 120 and user equipments (UE) 131 and 132, which exist within one base station (eNodeB; eNB) 110 in a wireless communication system 100. The relay node 120 may transfer data received from the base station 110 to the user equipment 132 therein and transfer the data received from the user equipment 132 therein to the base station 110. Also, the relay node 120 may extend a high data rate region, enhance communication quality at a cell edge, and support communication inside a building or a zone beyond base station service coverage. In FIG. 1, a user equipment (hereinafter, referred to as macro-user equipment (Macro-UE)) such as the user equipment 131, which directly receives a service from the base station, and a user equipment (hereinafter, referred to as relay-user equipment (Relay-UE)) such as the user equipment 132, which receives a service from the relay node 120, are shown.

A wireless link between the base station and the relay node will be referred to as a backhaul link, a link from the base station to the relay node will be referred to as a backhaul downlink, and a link from the relay node to the base station will be referred to as a backhaul uplink. A link from the relay node to the user equipment will be referred to as an access downlink, and a link from the user equipment to the relay node will be referred to as an access uplink.

In the mean time, a multiple input multiple output (MIMO) system means a system that enhances transmission and reception efficiency of data by using multiple transmitting antennas and multiple receiving antennas. The MIMO technology may be divided into a spatial multiplexing scheme and a spatial diversity scheme. As the spatial diversity scheme may enhance transmission reliability through diversity gain or enlarge cell radius, it is suitable for data transmission for a user equipment which moves at high rate. The spatial multiplexing scheme may increase a data transmission rate without increasing a system bandwidth by simultaneously transmitting different data at the same time.

A single-cell MIMO operation may be divided into a single user-MIMO (SU-MIMO) operation and a multi user-MIMO (MU-MIMO) operation. According to the single user-MIMO operation, one user equipment receives a downlink signal on a specific physical resource block (PRB) in one cell. According to the multi user-MIMO operation, two or more user equipments (or one or more user equipments and one or more relay nodes) receive a downlink signal on a specific PRB in one cell.

In the MIMO system, each transmitting antenna has an independent data channel. The transmitting antenna may mean a virtual antenna or a physical antenna. The receiver receives data transmitted from each transmitting antenna by estimating a channel for each transmitting antenna. Channel estimation means a procedure of recovering a received signal by compensating for signal distortion caused by fading. In this case, fading means that signal strength is rapidly changed due to multi path-time delay in a wireless communication system environment. For channel estimation, a reference signal known by both a transmitter and a receiver is required. Also, the reference signal may be referred to as a pilot signal in accordance with the application standard.

A downlink reference signal is a pilot signal for coherent demodulation such as a physical downlink shared channel (PDSCH), a physical control format indicator channel (PCFICH), a physical hybrid indicator channel (PHICH), and a physical downlink control channel (PDCCH). Examples of the downlink reference signal include a common reference signal (CRS) shared by all the user equipments within a cell and a dedicated reference signal (DRS) for a specific user equipment only. The common reference signal may be referred to as a cell-specific reference signal. Also, the dedicated reference signal may be referred to as a user equipment-specific (UE-specific) reference signal or a demodulation reference signal (DMRS).

DISCLOSURE

Technical Problem

In the MU-MIMO operation, in case that a plurality of downlink receiving entities (for example, relay node and macro-user equipment) receive a downlink signal on a specific PRB from one cell at the same time, the corresponding downlink receiving entities may be configured in pairs for MU-MIMO transmission. At this time, a reference signal pattern for one (for example, relay node) of the plurality of downlink receiving entities may be configured differently from a reference signal pattern for another downlink receiving entity (for example, macro-user equipment), wherein these reference signal patterns constitute a pair of reference signal patterns. In this case, if different reference signal patterns for the plurality of downlink receiving entities are used, the downlink receiving entities may be affected by serious inter-layer interference in receiving their data due to transmission of reference signal for the other party (for example, macro-user equipment for the relay node, and relay node for the macro-user equipment) constituting a pair of receiving entities. For this reason, a problem may occur in that the MU-MIMO operation may not be performed normally. Accordingly, an object of the present invention devised to solve the conventional problem is to provide a method for transmitting a reference signal to perform MU-MIMO operation normally and efficiently.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transmitting a demodulation reference signal (DMRS) for downlink multi-user multiple input multiple output (MIMO) transmission comprises the steps of mapping a DMRS for a first layer on a downlink physical resource block in accordance with a first DMRS pattern; mapping a DMRS for a second layer on the downlink physical resource block in accordance with a second DMRS pattern; and transmitting the downlink physical resource block, wherein in the downlink physical resource block, a resource element corresponding to the second DMRS pattern is punctured on the first layer, and a resource element corresponding to the first DMRS pattern is punctured on the second layer.

Also, the first and second layers may be transmitted to different downlink receiving entities, respectively.

Also, the different downlink receiving entities are configured in pairs for the downlink multi-user MIMO transmission.

Also, the first and second DMRS patterns may be defined as different patterns on time and frequency positions, respectively.

Also, the resource elements punctured on the first and second layers may be those for data transmission or reference signal transmission on the first and second layers, respectively.

Also, in the downlink physical resource block, OFDM symbols that include the resource element corresponding to the second DMRS pattern may be punctured on the first layer, and OFDM symbols that include the resource element corresponding to the first DMRS pattern may be punctured on the second layer.

To solve the aforementioned technical problems, according to another embodiment of the present invention, a method for receiving a demodulation reference signal (DMRS) for downlink multi-user multiple input multiple output (MIMO) transmission comprises the steps of receiving a downlink physical resource block into which a DRMS for a first layer is mapped in accordance with a first DMRS pattern; acquiring channel information for the first layer through the DMRS; and demodulating data received through the first layer by using the acquired channel information, wherein in the downlink physical resource block, a DMRS for a second layer is further mapped in accordance with a second DMRS pattern, a resource element corresponding to the second DMRS pattern is punctured on the first layer, and a resource element corresponding to the first DMRS pattern is punctured on the second layer.

Also, the first and second layers may be transmitted to different downlink receiving entities, respectively.

Also, the different downlink receiving entities may be configured in pairs for the downlink multi-user MIMO transmission.

Also, the first and second DMRS patterns may be defined as different patterns on time and frequency positions, respectively.

Also, the resource elements punctured on the first and second layers may be those for data transmission or reference signal transmission on the first and second layers, respectively.

Also, in the downlink physical resource block, OFDM symbols that include the resource element corresponding to the second DMRS pattern may be punctured on the first layer, and OFDM symbols that include the resource element corresponding to the first DMRS pattern may be punctured on the second layer.

To solve the aforementioned technical problems, according to still another embodiment of the present invention, a base station for transmitting a demodulation reference signal (DMRS) for downlink multi-user multiple input multiple output (MIMO) transmission comprises a reception module receiving an uplink signal from a user equipment; a transmission module transmitting a downlink signal to the user equipment; and a processor connected to the reception module and the transmission module, controlling the base station that includes the reception module and the transmission module, wherein the processor maps a DMRS for a first layer on a downlink physical resource block in accordance with a first DMRS pattern, maps a DMRS for a second layer on the downlink physical resource block in accordance with a second DMRS pattern, and in the downlink physical resource block, punctures a resource element corresponding to the second DMRS pattern on the first layer and punctures a resource element corresponding to the first DMRS pattern on the second layer, and transmits the downlink physical resource block through the transmission module.

To solve the aforementioned technical problems, according to further still another embodiment of the present invention, a downlink receiving entity for receiving a demodulation reference signal (DMRS) for downlink multi-user multiple input multiple output (MIMO) transmission comprises a reception module receiving a downlink signal from a base station; a transmission module transmitting an uplink signal to the base station; and a processor connected to the reception module and the transmission module, controlling the downlink receiving entity that includes the reception module and the transmission module, wherein the processor receives a downlink physical resource block into which a DMRS for a first layer is mapped in accordance with a first DMRS pattern, acquires channel information for the first layer through the DMRS, and demodulates data received through the first layer by using the acquired channel information, and in the downlink physical resource block, a DMRS for a second layer is further mapped in accordance with a second DMRS pattern, a resource element corresponding to the second DMRS pattern is punctured on the first layer and a resource element corresponding to the first DMRS pattern is punctured on the second layer.

The aforementioned embodiments and the following detailed description of the present invention are only exemplary, and are for additional description of the present invention cited in claims.

Advantageous Effects

According to the present invention, a method and an apparatus for transmitting a reference signal, which can reduce inter-layer interference for reference signal transmission and perform MU-MIMO operation normally and efficiently, may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram illustrating a mapping pattern of a CRS and a DMRS defined in the existing 3GPP LTE system on a downlink resource block;

BEST MODE FOR CARRYING OUT THE INVENTION

Figure 1:
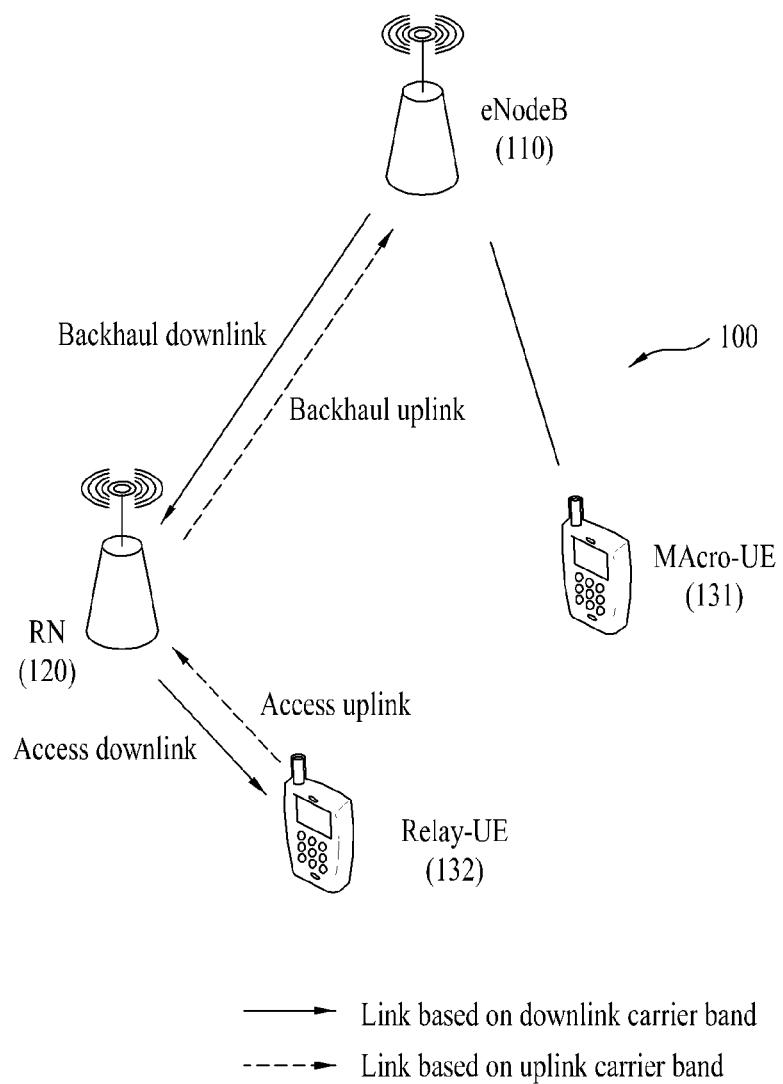
FIG. 1 is a diagram illustrating a wireless communication system that includes a base station, a relay node, and a user equipment.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the base station (BS) may be replaced with terms such as a fixed station, Node B, eNode B (eNB), and an access point (AP). Also, in this specification, the term, base station may be used as a concept that includes a cell or sector. Meanwhile, a relay may be replaced with a relay node (RN) or a relay station (RS). The terminal may be replaced with terms such as a user equipment (UE), a mobile station (MS), a mobile subscriber station (MSS), an advanced mobile station (AMS), or a subscriber station (SS). In this specification, a downlink receiving entity expressed as the user equipment (UE or MS) may be applied to the relay node as a downlink receiving entity.

Also, specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

Figure 2:
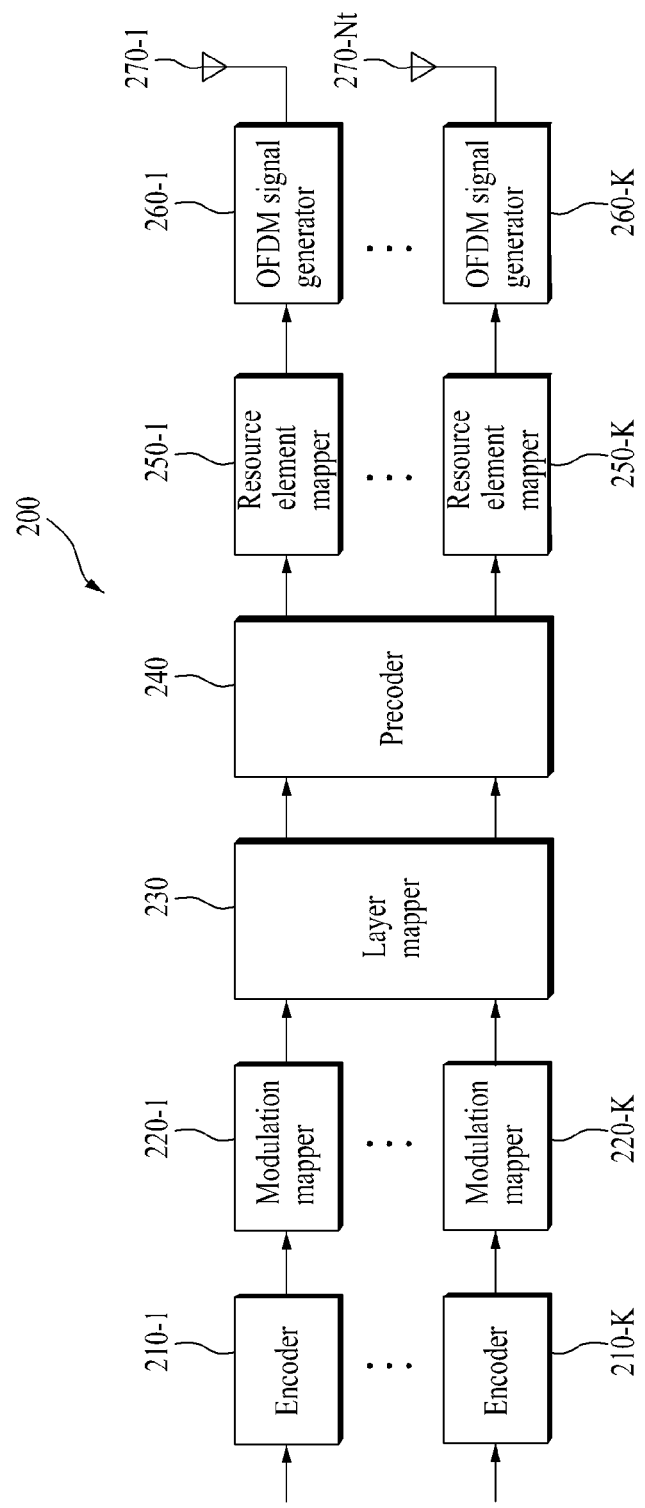
FIG. 2 is a block diagram illustrating a structure of a transmitter provided with multiple antennas.

FIG. 2 is a block diagram illustrating a structure of a transmitter provided with multiple antennas.

Referring to FIG. 2, the transmitter 200 includes encoders 210-1 to 210-K, modulation mappers 220-1 to 220-K, a layer mapper 230, a precoder 240, resource element mappers 250-1 to 250-K, and OFDM signal generators 260-1 to 260-K. The transmitter 200 includes Nt number of transmitting antennas 270-1 to 270-Nt.

The encoders 210-1 to 210-K form coded data by encoding input data in accordance with a given coding scheme. The modulation mappers 220-1 to 220-K map the coded data into modulation symbols representing a position on signal constellation. There is no limitation in a modulation scheme, and an example of the modulation scheme may include m-phase shift keying (m-PSK) or m-quadrature amplitude modulation (m-QAM). For example, m-PSK may be BPSK, QPSK or 8-PSK, and m-QAM may be 16-QAM, 64-QAM, or 256-QAM.

The layer mapper 230 defines a layer of the modulation symbols so that the precoder 240 may distribute antenna-specific symbols into a path of each antenna. The layer is defined by an information path input to the precoder 240. An information path prior to the precoder 240 may be referred to as a virtual antenna or layer.

The precoder 240 processes the modulation symbols in accordance with a MIMO scheme based on the multiple transmitting antennas 270-1 to 270-Nt and outputs the antenna-specific symbols. The precoder 240 distributes the antenna-specific symbols into the resource element mappers 250-1 to 250-K of a path of the corresponding antenna. Each information path sent to one antenna by the precoder 240 may be referred to as a stream. This may be referred to as a physical antenna.

The resource element mappers 250-1 to 250-K allocate the antenna-specific symbols to a proper resource element, and multiplex them in accordance with users. The OFDM signal generators 260-1 to 260-K modulate the antenna-specific symbols in accordance with the OFDM scheme and output OFDM symbols. The OFDM signal generators 260-1 to 260-K may perform inverse fast fourier transform (IFFT) for the antenna-specific symbols, and cyclic prefix (CP) may be prefixed to a time domain symbol where IFFT has been performed. The CP is a signal inserted to a guard interval to remove inter-symbol interference based on multi-path in an OFDM transmission scheme. The OFDM symbols are transmitted through each of the transmitting antennas 270-1 to 270-Nt.

A structure of a downlink radio frame will be described with reference to FIG. 3 and FIG. 4.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

Figure 3:
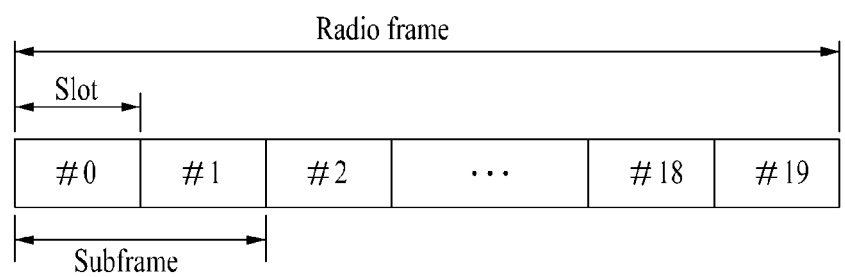
FIG. 3 is a diagram illustrating a structure of a type 1 radio frame.

FIG. 3 is a diagram illustrating a structure of a type 1 radio frame. The downlink radio frame includes 10 subframes, each of which includes two slots. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain.

The number of OFDM symbols included in one slot may be varied depending on configuration of CP. Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDCCH).

Figure 4:
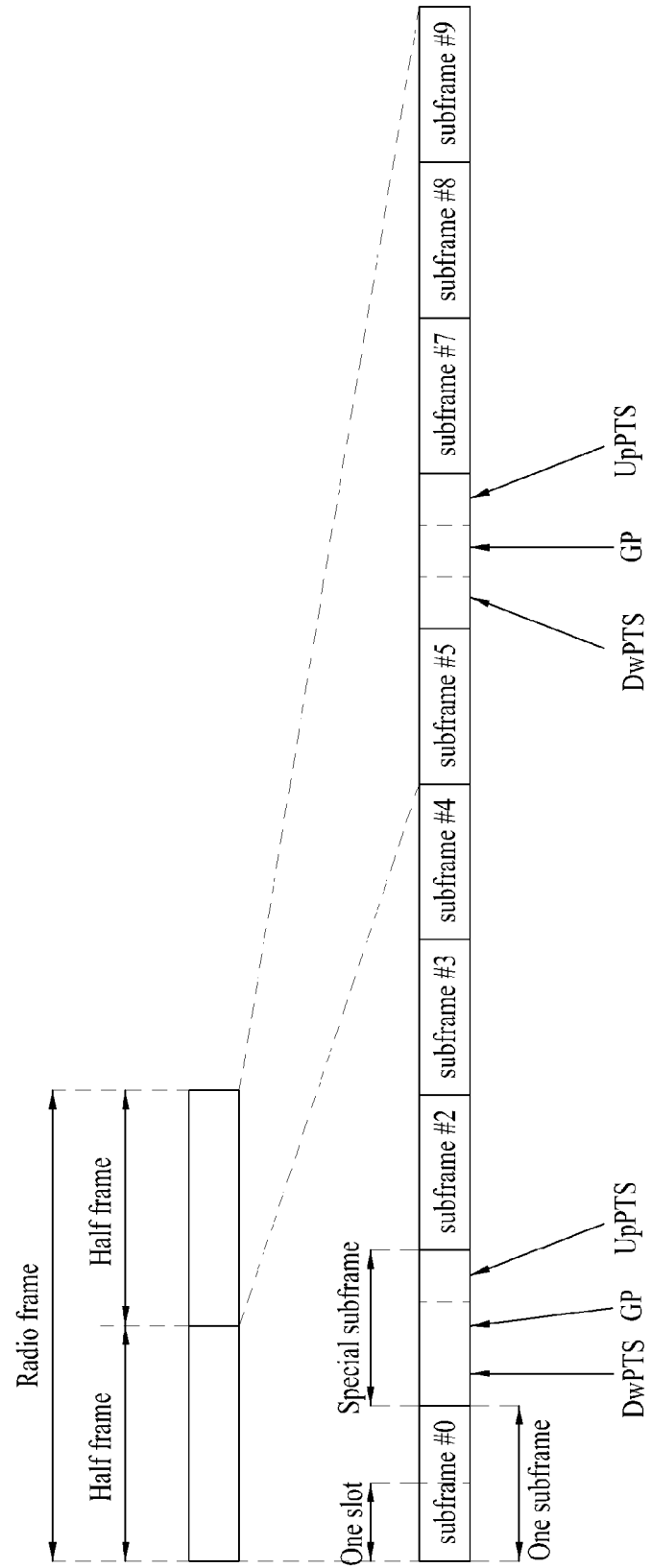
FIG. 4 is a diagram illustrating a structure of a type 2 radio frame.

FIG. 4 is a diagram illustrating a structure of a type 2 radio frame. The type 2 radio frame includes two half frames, each of which includes five subframes. The subframes may be divided into normal subframes and special subframes. The special subframes include three fields of a downlink pilot time slot (DwPTS), a guard period (GP), and an uplink pilot time slot (UpPTS). Although a length of these three fields may be set respectively, the entire length of the three fields should be 1 ms. One subframe includes two slots. Namely, one subframe includes two slots regardless of a type of the radio frame.

The structure of the radio frame is only exemplary, and various modifications may be made in the number of subframes included in the radio frame, the number of slots included in the subframe, or the number of symbols included in the slot.

Figure 5:
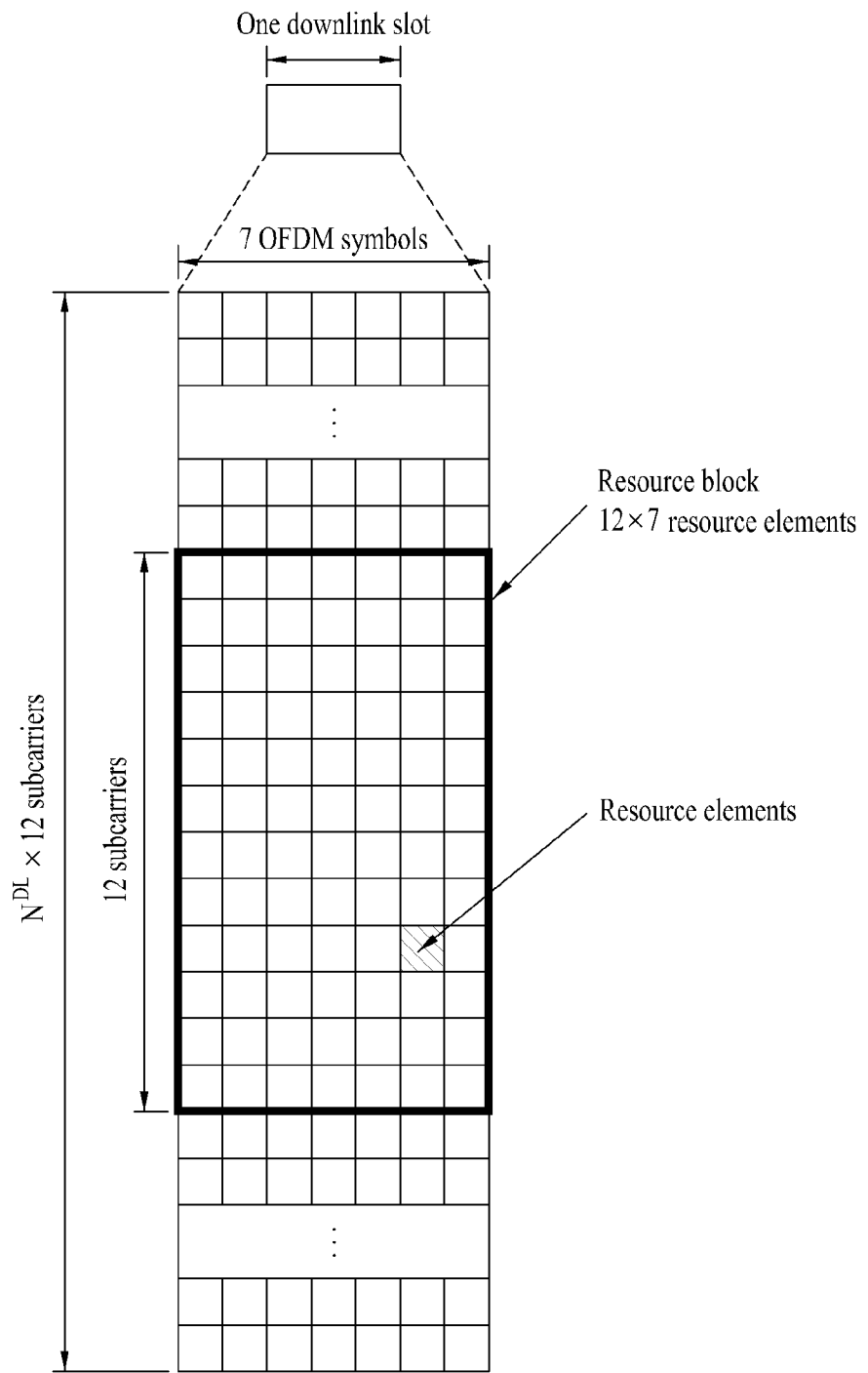
FIG. 5 is a diagram illustrating a resource grid of a single downlink slot.

FIG. 5 is a diagram illustrating an example of a resource grid of one downlink slot. In this case, OFDM symbols are configured by normal CP. Referring to FIG. 5, the downlink slot includes a plurality of OFDM symbols in a time region and a plurality of resource blocks in a frequency region. In this case, one downlink slot includes, but not limited to, seven OFDM symbols, and one resource block includes, but not limited to, twelve subcarriers. Each element on the resource grid will be referred to as a resource element (RE). For example, a resource element a (k, l) becomes the resource element located at the kth subcarrier and the first OFDM symbol. In case of the normal CP, one resource block includes 12×7 resource elements (in case of the extended CP, one resource block includes 12×6 resource elements). Since the interval between the respective subcarriers is 15 kHz, one resource block includes about 180 kHz in the frequency domain. $N^{DL}$ is the number of resource blocks included in the downlink slot, and its value may be determined depending on a downlink transmission bandwidth set by scheduling of the base station.

Figure 6:
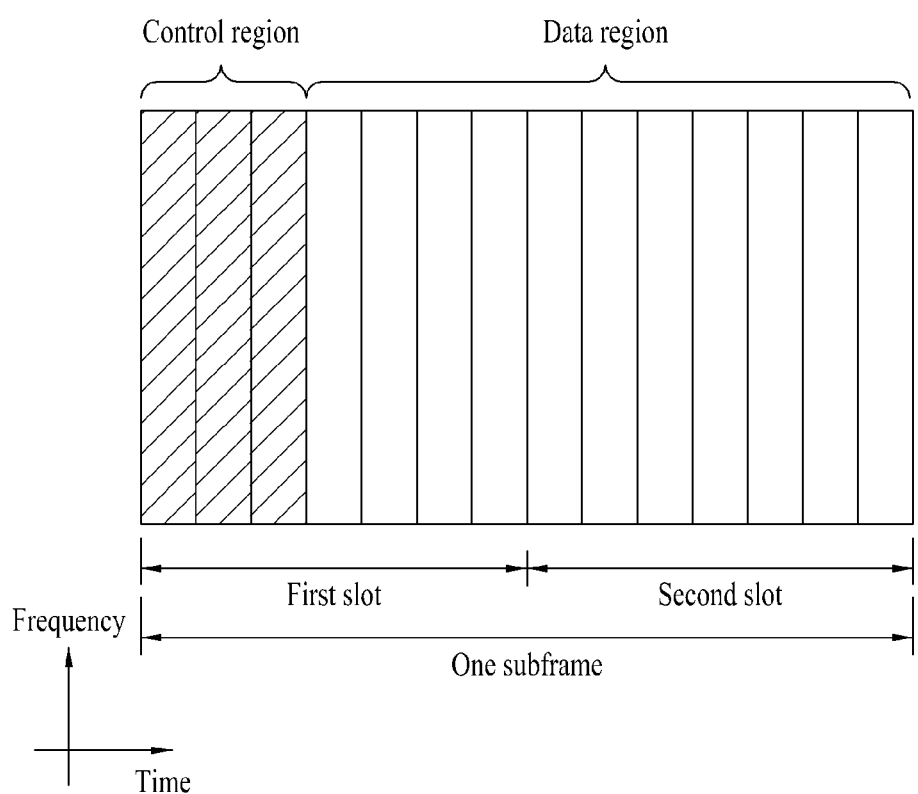
FIG. 6 is a diagram illustrating a structure of a downlink subframe.

FIG. 6 is a diagram illustrating a structure of a downlink subframe. Maximum three (one, two or three) OFDM symbols located at the front of the first slot within one subframe correspond to a control region to which a control channel is allocated. The other OFDM symbols correspond to a data region to which a physical downlink shared channel (PDSCH) is allocated. A basic unit of transmission is one subframe. In other words, PDCCH and PDSCH are allocated to two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK (acknowledgement/negative-acknowledgement) signals in response to uplink transmission. The control information transmitted through the PDCCH will be referred to as downlink control information (DCI). The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region. The user equipment may monitor the plurality of PDCCHs. The PDCCH is transmitted by aggregation of one or a plurality of continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCE. A base station determines a PDCCH format depending on the DCI transmitted to the user equipment, and attaches cyclic redundancy check (CRC) to the control information. The CRC is masked with an identifier (for example, radio network temporary identifier (RNTI)) depending on usage of the PDCCH or user of the PDCCH. If the PDCCH is for a specific user equipment, cell-RNTI (C-RNTI) of the corresponding user equipment may be masked with the CRC. If the PDCCH is for a paging message, a paging indicator identifier (P-RNTI) may be masked with the CRC. If the PDCCH is for system information (in more detail, system information block (SIB)), system information identifier and system information RNTI (SI-RNTI) may be masked with the CRC. In order to represent a random access response which is the response to transmission of random access preamble of the user equipment, a random access RNTI (RA-RNTI) may be masked with the CRC.

Figure 7:
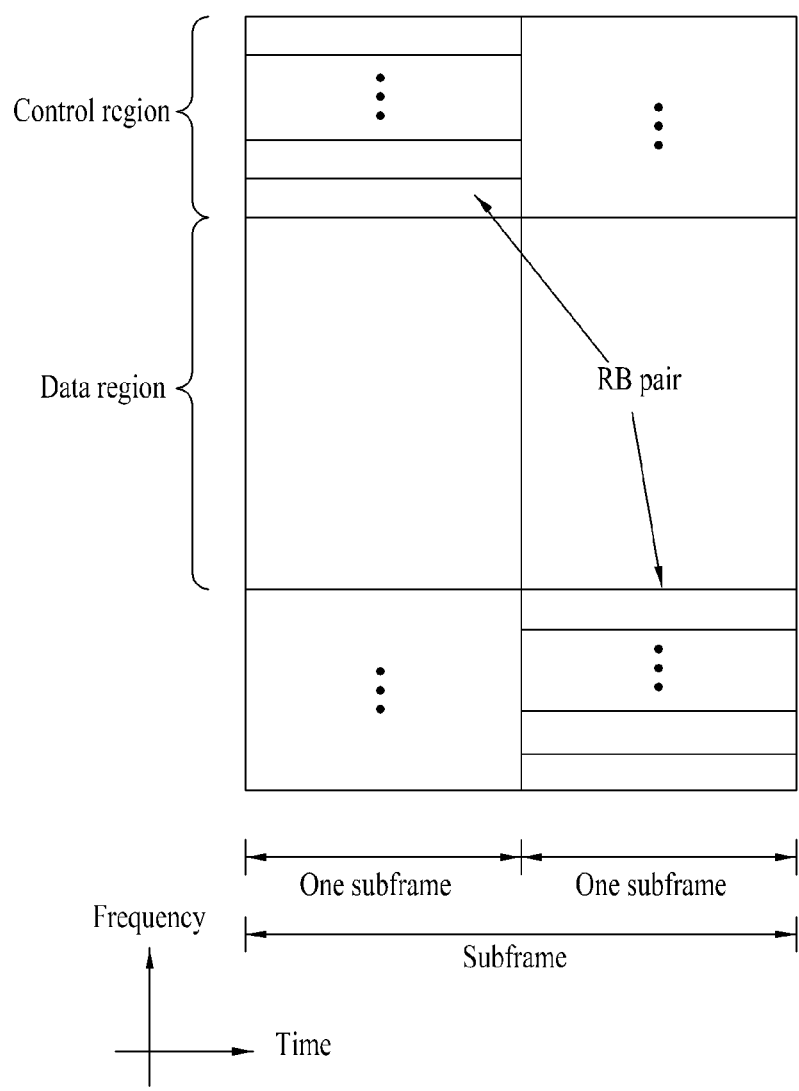
FIG. 7 is a diagram illustrating a structure of an uplink subframe.

FIG. 7 is a diagram illustrating a structure of an uplink subframe. The uplink subframe may be divided into a control region and a data region on a frequency domain. A physical uplink control channel (PUCCH) for carrying uplink control information is allocated to the control region. A physical uplink shared channel (PUSCH) for carrying user data is allocated to the data region. In order to maintain single carrier properties, one user equipment does not transmit the PUCCH and the PUSCH at the same time. The PUCCH for one user equipment is allocated to a pair of RBs at the subframe. Resource blocks belonging to the pair of RBs occupy different subcarriers for two slots. The pair of RBs allocated to the PUCCH are subjected to frequency hopping at the boundary of the slots.

Modeling of MIMO System

Figure 8:
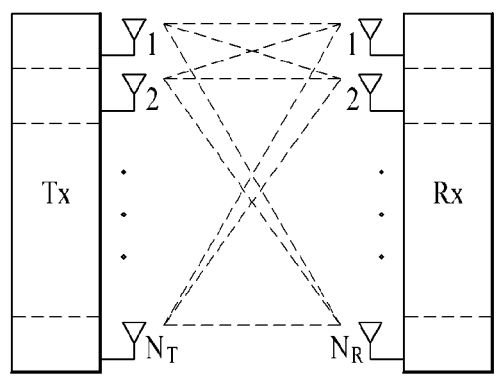
FIG. 8 is a schematic diagram illustrating a wireless communication system having multiple antennas.
Figure 8:
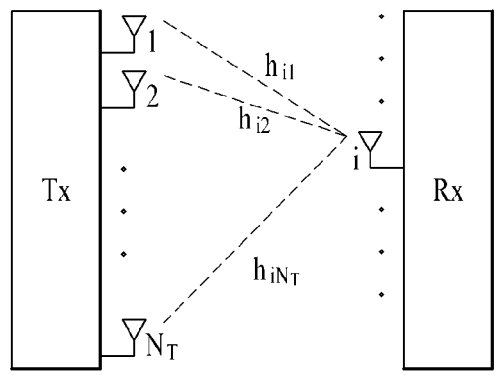

FIG. 8 is a schematic view illustrating a wireless communication system provided with multiple antennas. As shown in FIG. 8(a), if the number of transmitting antennas increases to $N_T$ and the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate based on increase of channel transmission capacity may increase theoretically as much as a value obtained by multiplying a maximum transmission rate $R_O$, which corresponds to a case where one antenna is used, by an increase rate $R_i$, as follows.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix W serves to properly distribute the transmission information to each antenna. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In this case, $W_{ij}$ means a weight value between the ith transmitting antenna and the jth information. W may be referred to as a precoding matrix.

If there exist $N_R$ receiving antennas, receiving signals $y_1, y_2, \ldots, y_{N_R}$ of the respective antennas may be expressed by a vector as follows.

$$y = [y_1, y_2, \ldots, y_{N_R}]^T$$ [Equation 6]

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

FIG. 8(b) illustrates channels from $N_T$ transmitting antennas from the receiving antenna i. Several channels may be grouped into one and then may be expressed by a vector type or a matrix type. As shown in FIG. 8(b), the channels from $N_T$ transmitting antennas to the ith receiving antenna may be expressed as follows.

$$h_i^T = [h_{i1}, h_{i2}, \ldots, h_{iN_T}]$$ [Equation 7]

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

Since additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n = [n_1, n_2, \ldots, n_{N_R}]^T$$ [Equation 9]

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R)$$ [Equation 11]

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

In this specification, 'Rank' for MIMO transmission represents the number of paths that can transmit a signal independently, and 'the number of layers' represents the number of signal streams transmitted through each path. Generally, since the transmitter transmits layers corresponding to the number of ranks, the ranks are the same as the number of layers unless mentioned otherwise.

Reference Signal (RS)

In order to correct distortion of a transmitted packet in a wireless communication system, channel information is required. A reference signal (or pilot signal) known by both a transmitting side and a receiving side may be transmitted, whereby channel information may be discovered by a distortion level when the reference signal is received through a channel.

If data are transmitted and received using multiple antennas, a channel status between each transmitting antenna and each receiving antenna should be identified to receive a normal signal. Accordingly, a separate reference signal should exist per transmitting antenna. Information for channel estimation and demodulation may be provided by a downlink reference signal (CRS and/or DMRS).

The receiving side (user equipment) may feed an indicator related to channel quality, such as a channel quality indicator (CQI), a precoding matrix index (PMI) and/or a rank indicator (RI), back to the transmitting side (base station) by estimating the channel status from the CRS. The CRS may be referred to as a cell-specific reference signal.

In the mean time, the DMRS may be transmitted through the corresponding resource element (RE) if demodulation is required for data on the PDSCH. The user equipment may be indicated from its upper layer as to the presence of the DMRS, and may be indicated that the DMRS is useful, only if the corresponding PDSCH is mapped. The DMRS may be referred to as a user equipment-specific (UE-specific) reference signal or a dedicated reference signal (DRS).

Figure 9:
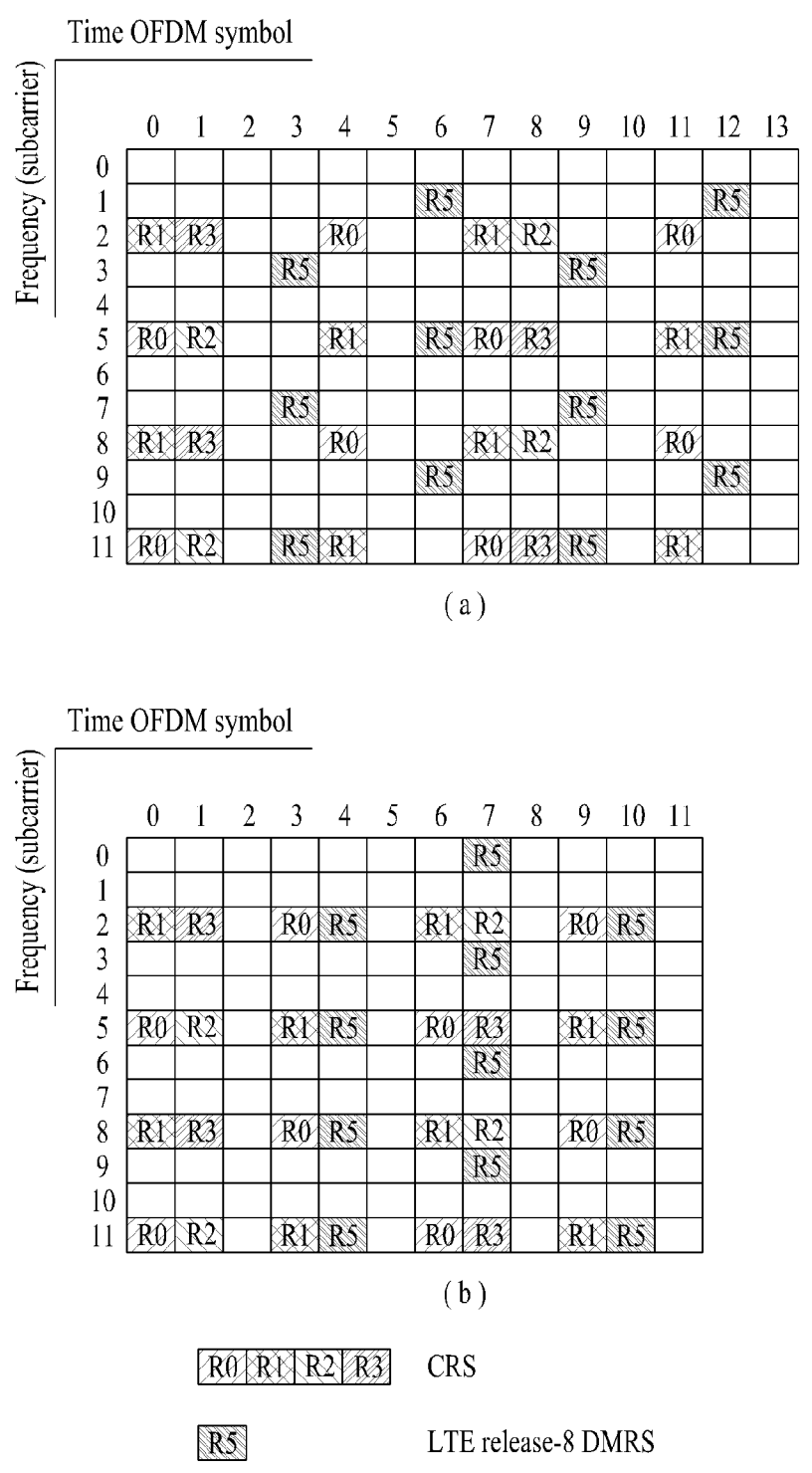

FIG. 9 is a diagram illustrating a mapping pattern of a CRS and a DMRS defined in the existing 3GPP LTE system (for example, release-8) on a downlink resource block. The downlink resource block as a mapping unit of the reference signal may be expressed by a unit of one subframe on time X twelve subcarriers on frequency. In other words, one resource block has a length of 14 OFDM symbols in case of normal CP (FIG. 9(a)) on time, and has a length of 12 OFDM symbols in case of extended CP (FIG. 9(b)).

FIG. 9 illustrates a position on a resource block of a reference signal in a system that supports four transmitting antennas through a base station. In FIG. 9, resource elements (REs) expressed as 'R0', 'R1', 'R2' and 'R3' respectively represent positions of CRS for antenna port indexes 0, 1, 2 and 3. Meanwhile, the resource element expressed as 'R5' in FIG. 9 represents a position of a DMRS defined in the existing LTE system (for example, LTE release-8).

Hereinafter, the CRS will be described in more detail.

The CRS is used to estimate a channel of a physical antenna port, is a reference signal that may commonly be received in all the user equipments located within a cell, and is distributed over a full band. The CRS may be used for acquisition of channel status information (CSI) and data demodulation.

The CRS is defined in various formats depending on antenna configuration of the transmitting side (base station). The 3GPP LTE (for example, release-8) system supports various antenna configurations, and a downlink signal transmitting side (base station) has three types of antenna configurations of single antenna, two transmitting antennas and four transmitting antennas. If the base station performs single antenna transmission, a reference signal for a single antenna port is arranged. If the base station performs two-antenna transmission, reference signals for two antenna ports are arranged in accordance with a time division multiplexing (TDM) and/or frequency division multiplexing (FDM) scheme. In other words, the reference signals for two antenna ports may be arranged in different time resources and/or different frequency resources, whereby the reference signals may be distinguished from each other. Also, if the base station performs four-antenna transmission, reference signals for four antenna ports are arranged in accordance with a TDM/FDM scheme. The channel information estimated by a downlink signal receiving side (user equipment) through the CRS may be used for demodulation of data transmitted in accordance with a transmission scheme such as single antenna transmission, transmit diversity, closed-loop spatial multiplexing, open-loop spatial multiplexing, and multi-user MIMO (MU-MIMO).

If a MIMO antenna function is used, a reference signal is transmitted to a position of a resource element (RE) designated by a reference signal pattern when the reference signal is transmitted from a random antenna port, and no signal is transmitted to a position of a resource element (RE) designated for another antenna port.

A mapping rule of CRS on a resource block depends on the following Equation 12.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In the Equation 12, k is a subcarrier index, l is a symbol index, and p is an antenna port index. $N_{symb}^{DL}$ is the number of OFDM symbols in one downlink slot, $N_{RB}^{DL}$ is the number of resource blocks allocated to the downlink, $n_s$ is a slot index, and $N_{ID}^{cell}$ means cell ID. mod means modulo operation. A position of the reference signal in the frequency domain depends on a value of $V_{shift}$. Since the value of $V_{shift}$ depends on cell ID, the position of the reference signal has different frequency shift values per cell.

In more detail, the position of the CRS on the frequency domain may be shifted to enhance channel estimation performance through the CRS. For example, if the reference signal is located per three subcarriers, a cell may be arranged on a subcarrier of 3k, and the other cells may be arranged on a subcarrier of 3k+1. In view of one antenna port, the reference signal is arranged in the frequency domain at intervals of six(6) resource elements (REs) (i.e., intervals of six subcarriers), and maintains intervals of three resource elements in the frequency domain with the RE where the reference signal for other antenna port is arranged.

Also, power boosting may be applied to the CRS. Power boosting means that among resource elements (REs) of one OFDM symbol, the power is derived from another RE not the RE allocated for the reference signal, so as to transmit the reference signal at the higher power.

The reference signals in the time domain are arranged at constant intervals starting from symbol index (l) 0 of each slot. The time interval is defined differently depending on the CP length. In case of normal CP, the reference signals are located at symbol indexes 0 and 4 of the slot. In case of extended CP, the reference signals are located at symbol indexes 0 and 3 of the slot. Only reference signals for maximum two antenna ports are defined for one OFDM symbol. Accordingly, the reference signals for antenna ports 0 and 1 are located at the symbol indexes 0 and 4 (symbol indexes 0 and 3 in case of extended CP) of the slot during transmission of four transmitting antennas, and the reference signals for the antenna ports 2 and 3 are located at the symbol index l of the slot. However, the frequency positions of the reference signals for the antenna ports 2 and 3 are switched to each other at the second slot.

In order to support spectral efficiency higher than that of the existing 3GPP LTE (for example, 3GPP LTE release-8)

system, a system (for example, LTE-A system) having extended antenna configuration may be designed. For example, extended antenna configuration may be configuration of eight transmitting antennas. The system having extended antenna configuration needs to support user equipments operated by the existing antenna configuration, i.e., backward compatibility. Accordingly, is required to support a reference signal pattern based on the exiting antenna configuration and design a new reference signal pattern for additional antenna configuration. In this case, if a CRS for a new antenna port is added to the system having the existing antenna configuration, reference signal overhead is rapidly increased, whereby a data transmission rate is reduced. Considering this, design of a new reference signal (CSI-RS) for measuring channel status information (CSI) for a new antenna port has been discussed.

Hereinafter, the DMRS will be described in more detail.

The DMRS (or user equipment-specific reference signal) is the reference signal used for data demodulation, and a precoding weight value used for a specific user equipment during multi-antenna transmission is applied to this reference signal, whereby the user equipment may estimate an equivalent channel that includes a transport channel and the precoding weight value transmitted from each transmitting antenna when the user equipment receives the reference signal.

The existing 3GPP LTE system (for example, release-8) supports transmission of maximum four transmitting antennas, and a DMRS for rank 1 beamforming is defined in this existing 3GPP LTE system. The DMRS for rank 1 beamforming may be referred to as a reference signal ('R5' in FIG. 9) for antenna port index 5. A mapping rule of the DMRS on the resource block depends on the following Equations 13 and 14. The Equation 13 is for the normal CP, and the Equation 14 is for the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In the Equations 13 and 14, k is a subcarrier index, l is a symbol index, and p is an antenna port index. $N_{SC}^{RB}$ represents the size of the resource block in the frequency domain, and is expressed by the number of subcarriers. $n_{PRB}$ represents a physical resource block number. $N_{RB}^{PDSCH}$ represents a bandwidth of the resource block of corresponding PDSCH transmission. $n_s$ is a slot index, and $N_{ID}^{cell}$ means cell ID. Also, mod means modulo operation. A position of the reference signal in the frequency domain depends on a value of $V_{shift}$. Since the value of $V_{shift}$ depends on cell ID, the position of the reference signal has different frequency shift values per cell.

In the mean time, in the LTE-A system which is an evolved version of the 3GPP LTE system, MIMO of high order, multi-cell transmission, and advanced MU-MIMO may be considered. To manage an efficient reference signal and support an advanced transmission scheme, DMRS based data demodulation is considered. In other words, to support data transmission through additional antenna, DMRS for two or more layers may be defined separately from a DMRS (R5) for rank 1 beamforming defined in the existing 3GPP LTE (for example, 3GPP LTE release-8). Preferably, the DMRS is set to exist only in a resource block and layer, where downlink transmission is scheduled by the base station.

An example of a new DMRS pattern defined in the LTE release-9 or LTE-A (LTE release-10 or subsequent LTE-release) will be described with reference to FIG. 10.

In the LTE release-9 or LTE-A system, a precoded reference signal may be used for downlink MIMO transmission. In this way, since the newly defined DMRS may be precoded by the same precoder as that applied to data, a precoding matrix is transparent to the user equipment. Accordingly, in downlink MIMO transmission, the DMRS corresponding to each layer is transmitted, whereby transmission of separate precoding information may not be required. As a result, reference signal overhead may be reduced.

Figure 10:
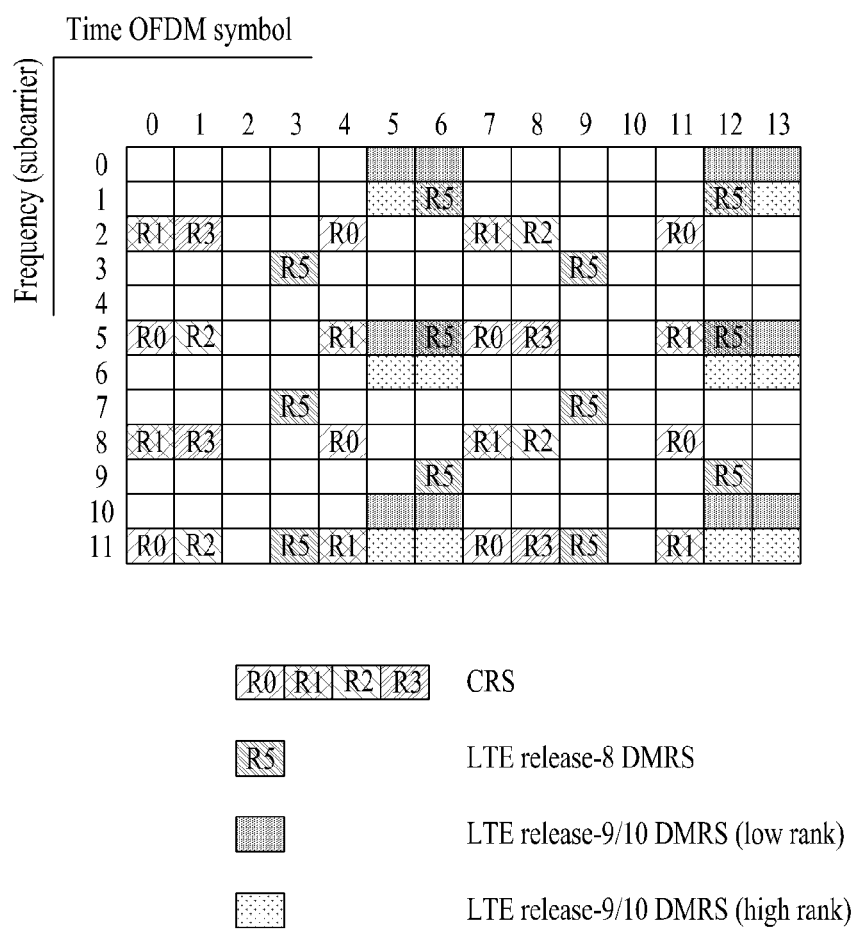
FIG. 10 is a diagram illustrating an example of a DMRS pattern introduced in a 3GPP LTE release-9/10 system.

FIG. 10 illustrates an example of a DMRS pattern of the LTE release-9/10, which is additionally defined, in addition to the CRS (R0, R1, R2 and R3) and the DMRS (R5) in case of normal CP described in FIG. 9(a). In the DMRS pattern of the LTE release-9/10, the DMRS used in case of low rank may be arranged on twelve (12) resource elements (REs) within one resource block. In case of high rank, the DMRS may be arranged on twenty-four (24) resource elements (REs) within one resource block. For example, when transmission rank is 1 to 2, the DMRS pattern (twelve REs) of the LTE release-9/10, which is used in case of low rank, may be used. When transmission rank is 3 to 8, the DMRS pattern (twenty-four REs) of the LTE release-9/10, which is used in case of low rank and high rank, may be used. Also, when transmission rank is 1 to 4, the DMRS pattern (twelve REs) of the LTE release-9/10, which is used in case of low rank, may be used. When transmission rank is 5 to 8, the DMRS pattern (twenty-four REs) of the LTE release-9/10, which is used in case of low rank and high rank, may be used. However, the DMRS pattern is not limited to the above examples, and a proper DMRS pattern may be used depending on transmission rank.

LTE release-9/10 DMRS for supporting transmission of maximum rank 8 may be arranged on a radio resource through multiplexing for each layer. Time division multiplexing (TDM) means that the DMRS for two or more layers are arranged on different time resources (for example, OFDM symbols). Frequency division multiplexing (FDM) means that the DMRS for two or more layers are arranged on different frequency resources (for example, subcarriers). Code division multiplexing (CDM) means that the DMRS for two or more layers arranged on the same radio resource are multiplexed using orthogonal sequences (or orthogonal covering) between OFDM symbols or between frequency subcarriers for corresponding RS resource elements.

In particular, orthogonal cover code used to apply CDM to RS resource elements on the OFDM symbols where the DMRS are located may be abbreviated as OCC. For example, Walsh code, discrete fourier transform (DFT) matrix, etc. may be used as the OCC.

In the mean time, in order to operate MU-MIMO defined in the 3GPP LTE (for example, release-8) system, each user equipment may perform data demodulation by using precoding weight information acquired through a control channel and channel information acquired through a cell-specific reference signal. However, when MU-MIMO is operated in the 3GPP LTE release-9 and the LTE-A system where the DMRS that can support multiple layers as described above is designed, the base station may not be required to inform each user equipment of the precoding weight value and may operate MU-MIMO without multi-user interference by using the channel information acquired by each user equipment through the DMRS.

DMRS Pattern on DwPTS Subframe

In a frame structure of a TDD type (type 2), a DwPTS length at a special subframe that includes DwPTS is different from a length of a normal subframe. For example, the DwPTS length may have a length of 3, 9, 10, 11 or 12 OFDM symbols in case of normal CP, and may have a length of 3, 7, 8, 9 or 10 OFDM symbols in case of extended CP. When the DwPTS has a length of three OFDM symbols, since data transmission is not performed, no DMRS is required. In other case, since the number of REs where the DMRS is arranged is not sufficient, the DMRS position may be determined properly to prevent data demodulation performance from being deteriorated.

Figure 11:
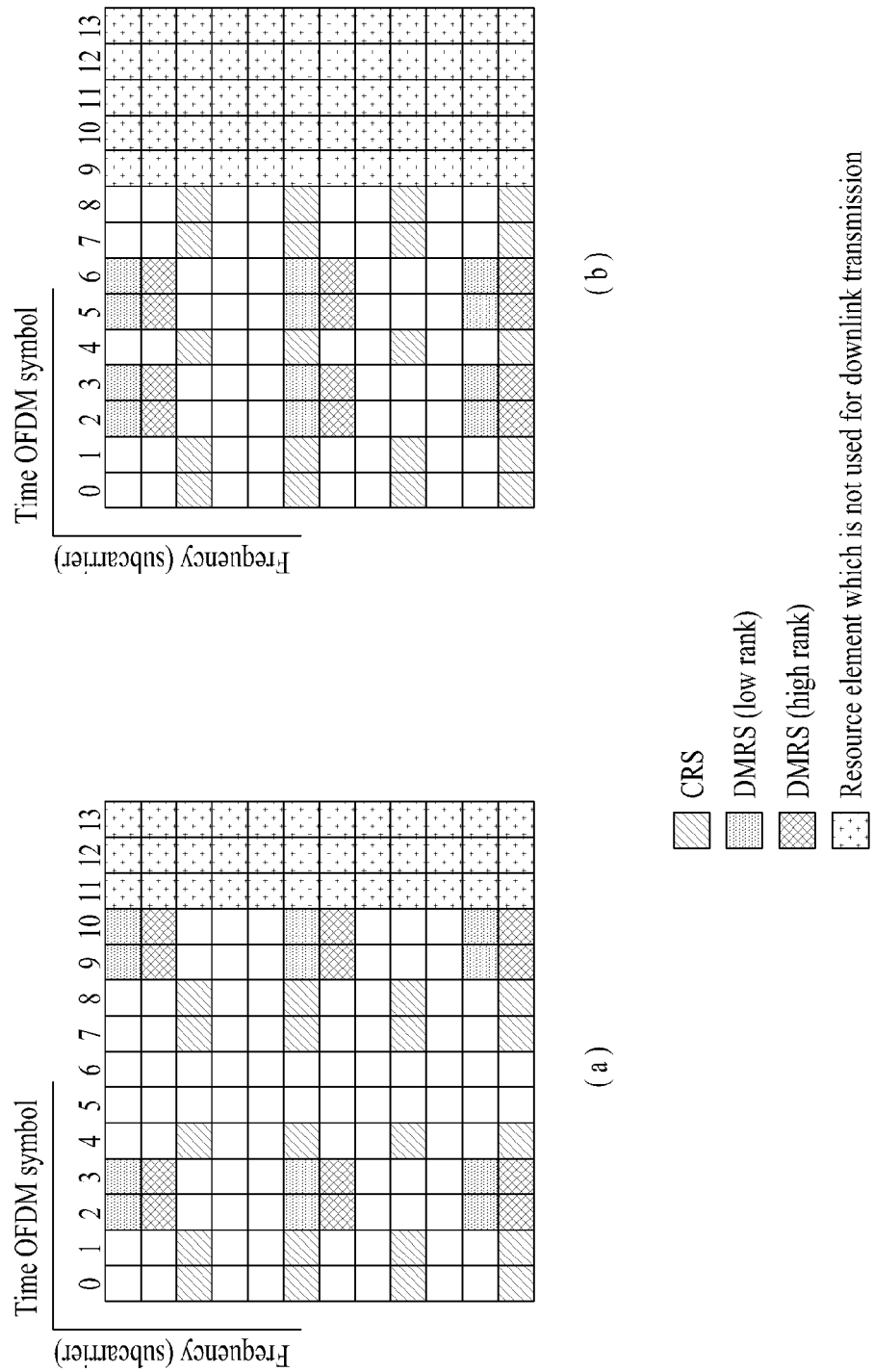
FIG. 11 is a diagram illustrating an example of a DMRS pattern at a special subframe that includes a DwPTS.

FIG. 11 is a diagram illustrating an example of a DMRS pattern at a special subframe that includes a DwPTS.

FIG. 11(a) illustrates a DMRS pattern when a DwPTS has a length of 11 or 12 OFDM symbols. In this case, the DMRS may be arranged on OFDM symbol indexes 2, 3, 9 and 10, and the DMRS pattern at the normal subframe described in FIG. 10 may be expressed as being timely shifted (T-shift).

In the mean time, FIG. 11(b) illustrates a DMRS pattern when a DwPTS has a length of 9 or 10 OFDM symbols. In this case, the DMRS may be arranged on OFDM symbol indexes 2, 3, 5 and 6, and the DMRS pattern at the normal subframe described in FIG. 10 may be expressed as being timely shifted (T-shift).

Wireless Communication System that Supports Relay Node

Referring to FIG. 1 again, the relay node 120 serves to forward transmission and reception between the base station 110 and the user equipment 131, and two types of links (backhaul link and access link) having different attributes are applied to each of carrier frequency bands. If a backhaul link between the base station 110 and the relay node 120 uses a downlink frequency band or a downlink subframe resource, it may be referred to as a backhaul downlink. If a backhaul link between the base station 110 and the relay node 120 uses an uplink frequency band or an uplink subframe resource, it may be referred to as a backhaul uplink. In this case, the frequency band is the resource allocated by a frequency division duplex (FDD) mode, and the subframe is the resource allocated by a time division duplex (TDD) mode. Similarly, if an access link between the relay node 120 and the user equipment(s) 131 uses a downlink frequency band or a downlink subframe resource, it may be referred to as an access downlink. If an access link between the relay node 120 and the user equipment(s) 131 uses an uplink frequency band or an uplink subframe resource, it may be referred to as an access uplink.

FIG. 1 illustrates configuration of backhaul uplink/downlink and access uplink/downlink in an FDD mode relay node.

The base station needs functions of uplink reception and downlink transmission, whereas the user equipment needs functions of uplink transmission and downlink reception. Meanwhile, the relay node needs all the functions of backhaul uplink transmission to the base station, access uplink reception from the user equipment, backhaul downlink reception from the base station, and access downlink transmission to the user equipment. In other words, the relay node needs transmission and reception functions for each of the uplink and the downlink as illustrated in Table 1 below.

TABLE 1

| Function | Base station | Relay node | User equipment |
|---|---|---|---|
| Downlink transmission | ◯ | ◯ | X |
| Downlink reception | X | ◯ | ◯ |
| Uplink transmission | X | ◯ | ◯ |
| Uplink reception | ◯ | ◯ | X |

Figure 12:
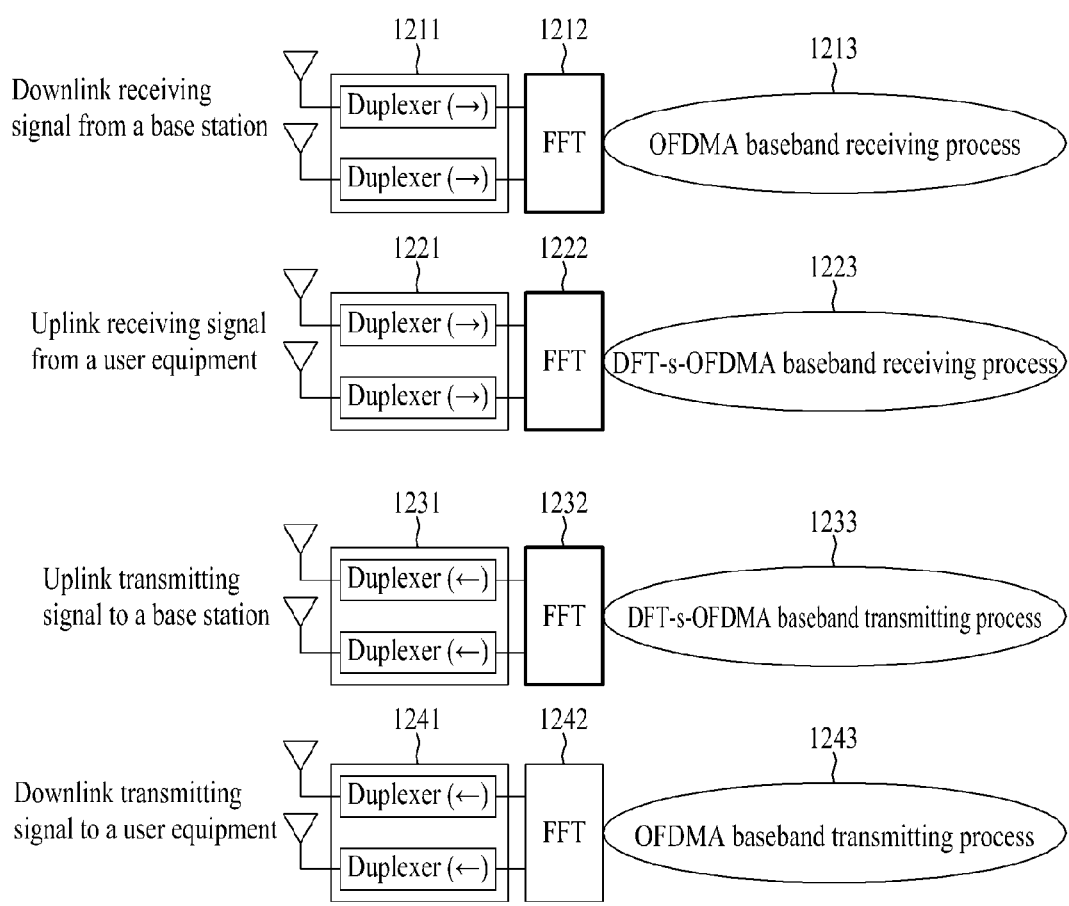
FIG. 12 is a diagram illustrating an example of functions of a transmitter and a receiver in an FDD mode relay node.

FIG. 12 is a diagram illustrating an example of functions of a transmitter and a receiver in an FDD mode relay node. A reception function of the relay node will be described conceptionally. A downlink receiving signal from the base station is transferred to a fast fourier transform (FFT) module 1212 through a duplexer 1211, and OFDMA baseband receiving process 1213 is performed. An uplink receiving signal from the user equipment is transferred to an FFT module 1222 through a duplexer 1221, and discrete fourier transform-spread-OFDMA (DFT-s-OFDMA) baseband receiving process 1223 is performed. The downlink signal receiving process from the base station and the uplink signal receiving process from the user equipment may be performed in parallel at the same time. Meanwhile, a transmission function of the relay node will be described conceptionally. An uplink transmission signal to the base station is transmitted through a DFT-s-OFDMA baseband transmission process 1223, an inverse FFT (IFFT) module 1232, and a duplexer 1231. A downlink transmission signal to the user equipment is transmitted through an OFDM baseband transmission process 1243, an IFFT module 1242, and a duplexer 1241. The uplink signal transmission process to the base station and the downlink signal transmission process to the user equipment may be performed in parallel at the same time. Also, the duplexers shown in one direction may be implemented by one bidirectional duplexer. For example, the duplexer 1211 and the duplexer 1231 may be implemented by one bidirectional duplexer, and the duplexer 1221 and the duplexer 1241 may be implemented by one bidirectional duplexer. The bidirectional duplexer may be implemented in such a manner that the IFFT module and the baseband process module line, which are associated with transmission and reception on a specific carrier frequency band, are forked from one bidirectional duplexer.

In the mean time, a case where the backhaul link is operated in the same frequency band as that of the access link will be referred to as 'in-band', and a case where the backhaul link is operated in a frequency band different from that of the access link will be referred to as 'out-band'. In case of an in-band relay node, if backhaul downlink reception from the base station and access downlink transmission to the user equipment are performed in a predetermined frequency band at the same time, a transport signal from the transmitter of the relay node may be received in the receiver of the relay node. As a result, signal interference or RF jamming may occur in FR front-end of the relay node. Similarly, if access uplink reception from the user equipment and backhaul uplink transmission to the base station are performed in a predetermined frequency band at the same time, signal interference may occur in FR front-end of the relay node. In order to avoid such signal interference, the relay node may be set such that transmission and reception may not occur in the same frequency band at the same time. For example, a TDM mode between backhaul downlink reception and access downlink transmission may be used such that the relay node may repeatedly receive a backhaul downlink in a predetermined frequency band for a predetermined time interval and transmit an access downlink for another time interval. Likewise, a TDM mode between backhaul uplink transmission and access uplink reception may be used. The relay node operated as above may be referred to as a half-duplex relay node. In this case, it is required that a guard time for transmission and reception operation switching of the relay node should be set. For example, for switching between backhaul downlink reception and access downlink transmission, a guard time may be set at a subframe set for backhaul downlink reception.

Configuration of Backhaul Downlink Subframe of Relay Node

As a relay node that performs a function of transmitting data and control information is provided between a user equipment and a base station (or cell) on a system of an FDD mode or a TDD mode, the backhaul uplink/downlink between the base station and the relay node and the access uplink/downlink between the relay node and the user equipment may be defined as described above. A relay node that includes an independent radio resource management (RRM) and L1/L2 layers and has a separate physical cell ID and the same functionality as that of the base station may be defined as a type-1 relay node.

In implementing a normal relay node, partitioning may be applied to the access link and the backhaul link in accordance with a TDM mode in a subframe unit of 1 ms on the same frequency carrier (i.e., same IFFT/FFT region). In this case, it is required to support link between user equipments (hereinafter, referred to as 'legacy user equipment (legacy-UE)') operated in accordance with a wireless communication system (for example, the existing LTE release-8 or 9 system) where no relay node is provided. In other words, it is required to support backward-compatibility. At this time, the relay node needs to support a measurement function of the legacy user equipments within its region. Accordingly, even on a subframe set for backhaul downlink transmission, the relay node needs to perform access downlink transmission not backhaul downlink reception for first N (N=1, 2 or 3) OFDM symbol intervals of the subframe.

Figure 13:
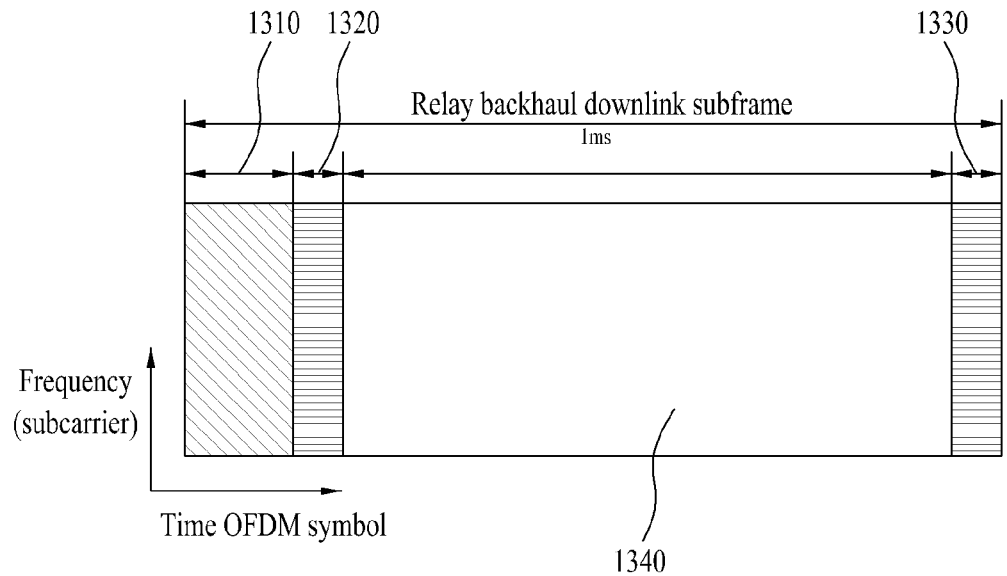
FIG. 13 is a diagram illustrating an example of a structure of a backhaul downlink subframe.

FIG. 13 is a diagram illustrating an example of a structure of a backhaul downlink subframe.

In FIG. 13, a relay node non-hearing interval 1310 means an interval where the relay node transmits an access downlink signal without receiving a backhaul downlink signal. This interval 1310 may be set to a length of 1, 2 or 3 OFDM symbols (first to third OFDM symbols of OFDM symbol indexes #0, #1 and #2) as described above.

A guard time 1320 is an interval where the relay node performs transmission-to-reception mode switching, and a guard time 1330 is an interval where the relay node performs reception-to-transmission mode switching. A length of the guard time may be given by a value of a time domain, or may be set to k time sample values on the basis of a time sample (Ts) value. The guard time may be set to a length of one or more OFDM symbols as the case may be. For example, if relay node backhaul downlink subframes are continuously set, or in accordance with predetermined subframe timing alignment, the guard time 1330 of the last part of the subframe may be neither defined nor set. The guard time 1320 and 1330 may be defined only in a frequency domain set for relay node backhaul downlink subframe transmission on a predetermined downlink component carrier (CC).

For a relay node backhaul downlink reception interval 1340, the relay node may receive a PDCCH and a PDSCH from the base station. This relay node may be expressed as relay-PDCCH (R-PDCCH) and relay-PDSCH (R-PDSCH) in view of a dedicated physical channel. Also, for this interval 1340, the relay node may receive a PCFICH (i.e., R-PCFICH) and/or a PHICH (i.e., R-PHICH) from the base station as the case may be.

The interval 1340 where the relay node receives R-PDCCH and/or R-PDSCH, i.e., a relay hearing guaranteed OFDM symbol region may be set to an interval of OFDM symbol indexes #3 to #13 (length of 11 OFDM symbols) if the number of entire resource blocks (RBs) exceeds 10. Alternatively, the interval 1430 may be set to an interval of OFDM symbol indexes #4 to #13 (length of 10 OFDM symbols) if the number of entire resource blocks (RBs) is less than 10.

Also, in defining transmission symbols on the subframe of FIG. 13, the OFDM symbols of the relay node non-hearing interval 1310 and the other intervals 1320, 1330 and 1340 may be defined as those to which extended CP or normal CP is applied independently.

The RS pattern described in FIG. 10 and FIG. 11 may be applied to the relay node backhaul downlink subframe in a limited status only. In more detail, the RS pattern at the normal subframe of FIG. 10 may be used only if the relay node may receive the last OFDM symbol (OFDM symbol index #13) of the backhaul downlink subframe. If the last symbol of the relay node backhaul downlink is set to the guard time, the DMRS pattern as shown in FIG. 10 cannot be applied to the relay node backhaul downlink subframe. The RS pattern at the special subframe (DwPTS subframe) of FIG. 11 may be used in a limited status (for example, only if a control format indicator (CFI) configuration value of the access downlink subframe is 1 and a CFI configuration value of the backhaul downlink subframe is 1 or 2) of the relay node backhaul downlink (CFI is control information for indicating the number of OFDM symbols used for PDCCH transmission, and is indicated to the receiving side per downlink subframe through the PCFICH). In other case, the DMRS pattern of FIG. 11 cannot be applied to the relay node backhaul downlink subframe.

Also, backhaul downlink transmission where a DMRS is used for demodulation for R-PDCCH of the relay node may be configured. In other words, the R-PDCCH may be transmitted through a transmit diversity scheme based on the DMRS, a predetermined precoding based rank-1 or spatial multiplexing.

Figure 14:
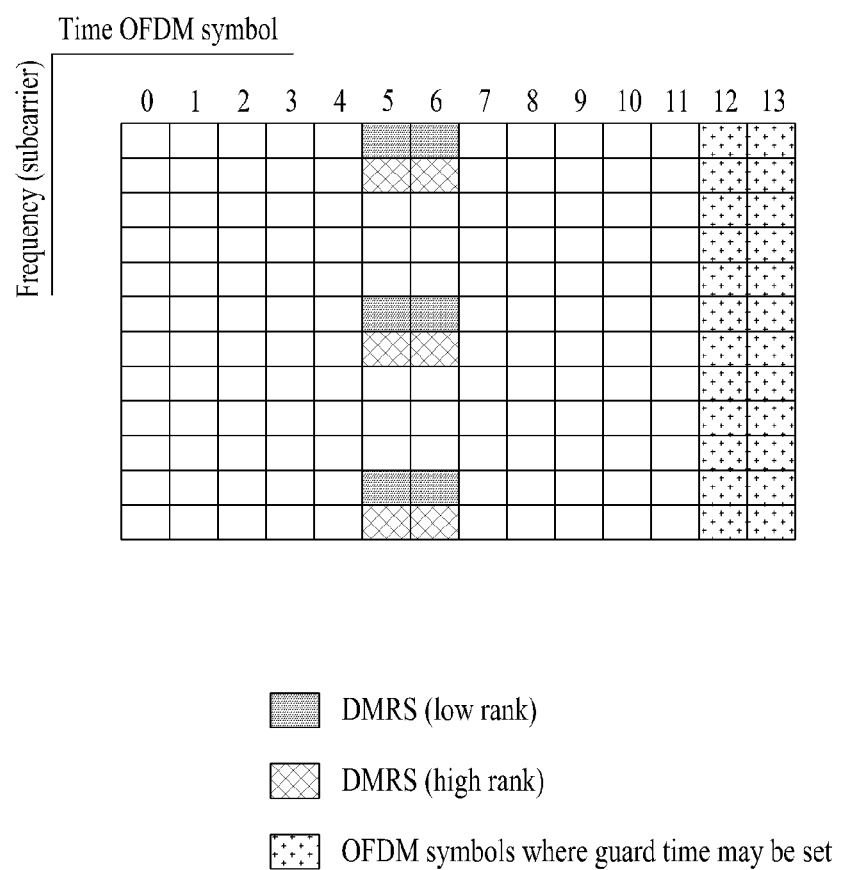
FIG. 14 is a diagram illustrating an example of a DMRS pattern at a backhaul downlink subframe.

The DMRS pattern may newly be designed for relay node backhaul link. In other words, a new DMRS pattern different from the DMRS pattern described in FIG. 10 and FIG. 11 may be applied for relay node backhaul downlink transmission. For example, as shown in FIG. 14, considering that one OFDM symbol or a random number of OFDM symbols of the last part of the downlink subframe in the DMRS pattern of FIG. 10 are not used for backhaul downlink transmission, a backhaul downlink subframe DMRS pattern except for DMRS REs of the second slot, i.e., DMRS REs defined at the last two OFDM symbols on the downlink subframe may be configured.

In addition, under the environment where line of sight (LoS) feature of a relay node backhaul link radio channel is robust, since it is difficult to use an advantage of channel distribution, MU-MIMO may be a transmission mode more preferable than SU-MIMO to increase system throughput performance. Entities that receive multiple antennas from a macro base station (or donor base station (donor eNB)) at the same time may be the relay node and the macro-user equipment. Accordingly, pairing based on a scheduler for MU-MIMO between downlink transmissions from the macro base station to a plurality of macro-user equipments and paring based on a scheduler for MU-MIMO between backhaul downlink transmissions from the macro base station to a plurality of relay nodes may be formed. Otherwise, backhaul link transmission from the macro base station to the relay node and transmission from the macro base station to the macro-user equipment may configure pairing for MU-MIMO on a random specific physical resource block (PRB).

At this time, since a downlink DMRS pattern for the relay node may be different from a downlink DMRS pattern for the macro-user equipment, DMRS transmission orthogonality may not be maintained for MU-MIMO transmission for the relay node and the macro-user equipment, which share the same PRB. Hereinafter, various methods of the present invention, which can maintain DMRS orthogonality in performing MU-MIMO transmission for the relay node and the macro-user equipment, will be described. The various methods suggested in the present invention may be applied as those for maintaining DMRS transmission orthogonality in case that transmission DMRS resources are set in different DMRS pattern subgroups as illustrated in FIG. 10 even in case of the same DMRS pattern in performing MU-MIMO transmission from the macro base station between the macro-user equipments or between the relay nodes.

Method 1

In order to describe the basic principle of the method 1, a case where a plurality of user equipments perform MU-MIMO operation will be described exemplarily.

It is assumed that two user equipments, which share downlink transmission on a specific PRB from the base station, exist (i.e., perform MU-MIMO operation). For example, it is assumed that entire downlink transmission rank from the base station is 3, downlink transmission is performed for the first user equipment (UE1) through two layers (first and second layers), and downlink transmission is performed for the second user equipment (UE2) through one layer (third layer). In this case, rank 2 transmission may be performed for the UE1, and rank 1 transmission may be performed for the UE2. In other words, transmission through two spatial resources is performed for the UE1, and transmission through one spatial resource is performed for the UE2.

Referring to FIG. 15(a), DMRS and data may be transmitted for the UE1 and UE2 through the same PRB (time/frequency resources) on different layers (spatial resources). The DMRS for the UE1 and the DMRS for the UE2 may be arranged on 24 REs. In more detail, for arrangement of the DMRS for entire rank 3 transmission in view of the base station, the DMRS for the first and second layers may be arranged on 12 REs (low rank DMRS position of FIG. 10), and the DMRS for the third layer may be arranged on the other 12 REs (high rank DMRS position of FIG. 10). For clarification of description, it is noted that transmission of RS or control signals other than the DMRS is not shown in FIG. 15(a).

Referring to FIG. 15(b), the DMRS for two layers may be transmitted for downlink signal demodulation for the UE1. In case of the DMRS pattern for the UE1, the DMRS for two layers may be multiplexed using OCC having a length of 2 in accordance with a CDM mode and then may be transmitted. In view of the UE1, data for the UE1 may be transmitted from resource elements other than the resource elements to which the DMRS for the UE1 is transmitted.

Referring to FIG. 15(c), the DMRS for one layer may be transmitted for downlink signal demodulation for the UE2. In view of the UE2, data for the UE2 may be transmitted from resource elements other than the resource elements to which the DMRS for the UE2 is transmitted.

Figure 16:
FIG. 16 is a diagram illustrating a structure of a subframe for downlink MU-MIMO transmission according to one embodiment of the present invention.
Figure 16:
Figure 16:
Figure 16:
Figure 16:

Under the circumstances, when the UE1 performs channel estimation through the DMRS for the UE1, the data for the UE2 may be transmitted to the DMRS position for the UE1, whereby inter-layer interference may occur. As a result, degradation of channel estimation performance through the DMRS for the UE1 may be caused. Likewise, when the UE2 performs channel estimation through the DMRS for the UE2, the data for the UE1 may be transmitted to the DMRS position for the UE2, whereby inter-layer interference may occur. As a result, degradation of channel estimation performance through the DMRS for the UE2 may be caused. FIG. 16 is a diagram illustrating a structure of a subframe for downlink MU-MIMO transmission according to one embodiment of the present invention.

As described above, in order to prevent data for each of the user equipments constituting a pair of downlink MU-MIMO from colliding with the DMRS for the other user equipments, it may be considered that data transmission for one user equipment may be punctured at the resource element position to which the DMRS for the other user equipments are transmitted. Puncturing of transmission on a resource element may be expressed as that no signal is transmitted or null signal is transmitted. In the present invention, as a method for implementing puncturing on a specific resource element, a method for physically nulling or puncturing a signal component for a resource element into which a signal is actually mapped, and a method for performing rate matching on the basis of the quantity of a physical resource after channel coding and for not mapping a signal component into a scheduled specific resource element may be used. Hereinafter, in the present invention, these two methods will be expressed as puncturing. As an embodiment that describes the above methods, for downlink subframe configuration for the UE1, the data for the UE1 may be punctured at the resource element position to which the DMRS for the UE2 is transmitted (FIG. 16(a)). Likewise, for downlink subframe configuration for the UE2, the data for the UE2 may be punctured at the resource element position to which the DMRS for the UE1 is transmitted (FIG. 16(b)). Accordingly, DMRS orthogonality for the respective user equipments that perform MU-MIMO operation may be maintained, and the respective user equipments may perform downlink signal demodulation normally.

Figure 15:
FIG. 15 is a diagram illustrating a configuration of transmission of a plurality of layers on one physical resource block for MU-MIMO transmission.
Figure 15:
Figure 15:
Figure 15:

In the description for the methods through FIG. 15 and FIG. 16, the UE1 and the UE2 are downlink receiving entities from the macro base station, which are described in the present invention, and may be applied as macro-user equipments or relay nodes. Otherwise, the UE1 and the UE2 may be applied as the macro-user equipment and the relay node, respectively, or may be used as the relay node and the macro-user equipment, respectively. Although the resource elements where the DMRS collides with the data are only punctured in FIG. 16, OFDM symbol(s) that include the resource element position to which the data colliding with the DMRS are transmitted may be punctured.

Although two user equipments or relay nodes perform the MU-MIMO operation in FIG. 15 and FIG. 16, the relay node and the macro-user equipment may be set to MU-MIMO pair, whereby the same principle may be applied to even the case where the MU-MIMO operation is performed.

The LTE release-8 user equipment may acquire channel information for MIMO transmission through the CRS. Meanwhile, the relay node may acquire channel information of downlink MU-MIMO transmission through a new DMRS pattern. If the LTE release-8 user equipment and the relay node perform downlink MU-MIMO operation in pairs, the DMRS for the relay node may collide with data for the LTE release-8 user equipment. In this case, in downlink subframe configuration for the LTE release-8 user equipment, data transmission for the LTE release-8 user equipment may be punctured at the resource element position to which the DMRS for the relay node is transmitted. Also, in downlink subframe configuration for the LTE release-8 user equipment, symbols that include the resource element position to which the DMRS for the relay node is transmitted may be punctured. The punctured symbols may include data only, or may additionally include RS (for example, user equipment-specific RS expressed as 'R5' in FIG. 10).

In the mean time, in downlink subframe configuration for the relay node, the same CRS may be transmitted to the relay node at the resource element position to which the CRS for the LTE release-8 user equipment is transmitted. In other words, since the CRS for downlink MU-MIMO operation of the LTE release-8 user equipment is transmitted cell-specifically, the CRS is transmitted to the LTE release-8 user equipment and the relay node at the same resource element position. In this embodiment, as different RS patterns are applied to each layer (spatial resource) on the same PRB, if RS for one layer collides with data for another layer, data transmission of the corresponding layer is punctured. Accordingly, in downlink subframe configuration of the relay node that performs downlink MU-MIMO operation together with the LTE release-8 user equipment in pairs, puncturing of data transmission may not be used.

In the mean time, in case that the LTE release-9 user equipment and the relay node perform downlink MU-MIMO operation in pairs, data and/or RS transmission for the relay node may be punctured at the DMRS resource element position (or symbol) for the LTE release-9 user equipment in downlink subframe configuration for the relay node, and data and/or RS transmission for the LTE release-9 user equipment may be punctured at the DMRS resource element position (or symbol) for the relay node in downlink subframe configuration for the LTE release-9 user equipment.

In short, in case that different DMRS patterns are applied to two downlink receiving entities (user equipment or relay node) that perform downlink MU-MIMO operation, a resource element (or symbol) to which data and/or RS for one user equipment (or relay node) is transmitted may be punctured, wherein the data and/or RS for one user equipment collides with the DMRS transmitted to another user equipment (or relay node). As a result, orthogonality of the DMRS may be maintained, and downlink MU-MIMO operation may be performed normally.

Also, the present invention is not limited to two downlink receiving entities (user equipments or relay nodes) that perform MU-MIMO operation. In other words, even in case that more than two downlink receiving entities (user equipments or relay nodes) perform MU-MIMO operation, the aforementioned principle of the present invention may equally be used. For example, in case that downlink MU-MIMO operation is performed for three downlink receiving entities (user equipments or relay nodes), in subframe configuration for one downlink receiving entity, data and/or RS transmission for the other two downlink receiving entities may be punctured at the resource element position (or symbol) to which the DMRS for the one downlink receiving entity is transmitted, whereby orthogonality between the DMRS may be maintained and downlink MU-MIMO operation may be performed normally.

In case that the DMRS for each downlink receiving entity is multiplexed in accordance with a CDM mode while the same DMRS pattern is being used, since the DMRS for one downlink receiving entity may not collide with the data for the other downlink receiving entities, DMRS orthogonality may be maintained. Accordingly, it is noted that the principle of the present invention may be applied to the case where different DMRS patterns (time/frequency positions) are applied to each layer when two or more downlink receiving entities (user equipments or relay nodes) perform downlink MU-MIMO operation in pairs.

Although the method 1 has been suggested for application for MU-MIMO transmission, it may be applied to transmission of a physical channel, which requires blind decoding of the relay node such as R-PDCCH, even in case of transmission to which MU-MIMO is not applied. For example, whether the number of possible transmitting antenna ports for R-PDCCH and/or R-PDSCH for the corresponding relay node is more than 2 may be applied from the base station through specific RRC signaling. Relay node specific RRC signaling may be considered such that the number of transmitting antenna ports for R-PDCCH and/or R-PDSCH for the corresponding relay node is more than 2. In this case, a DMRS pattern provided when the number of antenna ports is more than 2 may be used. When the number of antenna ports applied to actual transmission is less than 2, a method for not performing puncturing or rate matching for R-PDCCH or R-PDSCH transport symbols on different DMRS pattern REs additionally provided when the number of antenna ports is greater than 2 may be used. In implementing this method, the method 1 may be used.

Method 2

It may be considered a case where the LTE-A user equipment (user equipment based on LTE release-10 or subsequent LTE release system) and the relay node perform downlink MU-MIMO operation in pairs.

The DMRS pattern (hereinafter, referred to as 'LTE-A user equipment DMRS pattern') described in FIG. 10 and FIG. 11 may be applied to the LTE-A user equipment. Meanwhile, a new DMRS pattern (hereinafter, referred to as 'relay node DMRS pattern') as above may be applied to the relay node. In other words, different DMRS patterns may be applied to the LTE-A user equipment and the relay node. In this case, in case that the LTE-A user equipment and the relay node perform downlink MU-MIMO operation, the DMRS for the LTE-A user equipment or the relay node collides with data for the other party, whereby DMRS orthogonality may not be maintained.

Under the circumstances, detailed embodiments for allowing the LTE-A user equipment and the relay node to normally perform downlink MU-MIMO operation by maintaining DMRS orthogonality will be suggested hereinafter.

Embodiment 1

In a PRB (i.e., PRB shared between the user equipment and the relay node) to which downlink MU-MIMO transmission is applied, the originally designated 'relay DMRS pattern' may be applied to the relay node, and the same pattern as the 'relay DMRS pattern' not the 'LTE-A user equipment DMRS pattern' which is originally designated may be applied to the user equipment.

As described above, in case that the DMRS pattern for MU-MIMO transmission of the user equipment is configured equally to that for MU-MIMO transmission of the relay node, the DMRS for the user equipment and the DMRS for the relay node may be multiplexed on the same resource element position in accordance with a CDM mode based on OCC. Since a DMRS for any one downlink receiving entity does not collide with data of the other party, DMRS orthogonality may be maintained.

In order to set the DMRS pattern of the user equipment to the 'relay DMRS pattern' as above, the base station may use upper layer signaling (for example, RRC signaling) user equipment-specifically or explicitly indicate setting of the DMRS pattern on a downlink channel allocation PDCCH DCI format.

Alternatively, the base station may broadcast DMRS setup information as cell-specific system information through MBSFN configuration signaling. The user equipment may identify from MBSFN configuration signaling that the DMRS pattern ('relay DMRS pattern') applied to the relay node at the backhaul downlink subframe may be applied to transmission thereto.

Embodiment 2

In case that the relay node is located within a coverage of the base station (or cell), the same pattern as the 'relay DMRS pattern' not the DMRS pattern (LTE-A user equipment DMRS pattern) which is originally designated may be applied to the user equipment when the user equipment and the relay node perform downlink MU-MIMO operation.

The base station (or cell) may separately indicate to the user equipment that the relay node exists within the coverage of the base station, wherein the user equipment performs MU-MIMO operation together with the corresponding relay node. In other words, the base station (or cell) may use upper layer signaling (for example, RRC signaling) or explicitly indicate to the user equipment that the relay node exists within the base station (or cell) on the downlink channel allocation PDCCH DCI format. The user equipment signaled from the base station that the relay node exists within the coverage of the base station may identify that the 'relay DMRS pattern' may be applied to downlink transmission thereto. In more detail, the base station may indicate to the macro-user equipments or the relay nodes within the base station that the relay node, which uses a DMRS pattern dedicated for the relay node, exists within the coverage of the base station, wherein the DMRS pattern is different from that used in the LTE-A downlink transmission mode for the macro-user equipments. This indication may be performed using upper layer signaling (for example, RRC signaling) user equipment-specifically, relay node-specifically, or cell-specifically, or may explicitly be signaled on the downlink channel allocation PDCCH DCI format. In addition, as to whether transmission from the base station to a specific relay node in a transmission mode less than rank 2 is performed or whether transmission from the base station to the specific relay node in a transmission mode more than rank 2 is performed, the corresponding transmission configuration information may be indicated to the corresponding relay node through relay node-specific upper layer signaling. Also, the corresponding transmission configuration information may be signaled to the macro-user equipments or other relay nodes within a cell through upper layer signaling user equipment-specifically, relay node-specifically, or cell-specifically.

In case that the DMRS patterns for MU-MIMO transmission of the user equipment and the relay node are configured equally as above, the DMRS for the user equipment and the DMRS for the relay node may be multiplexed on the same resource element position in accordance with a CDM mode based on the OCC. Also, since a DMRS for any one downlink receiving entity does not collide with data of the other party, DMRS orthogonality may be maintained.

The aforementioned embodiments 1 and 2 are not limited to two downlink receiving entities (user equipments or relay nodes) that perform MU-MIMO operation. In other words, even in case that more than two downlink receiving entities (user equipments or relay nodes) perform MU-MIMO operation, the aforementioned principle of the present invention may equally be used. For example, the principle of the present invention may be applied to a case where downlink MU-MIMO operation is performed for three downlink receiving entities (user equipments or relay nodes) even though the DMRS patterns originally used among the three downlink receiving entities are different from one another. In other words, if the DMRS patterns originally used among the three downlink receiving entities (user equipments or relay nodes) are different from one another, the base station may indicate to the user equipment(s) that the same DMRS pattern (for example, 'relay DMRS pattern') may be used.

Embodiment 3

A DMRS pattern different from the originally defined DMRS pattern is not applied to the LTE-A user equipment, and based on that different DMRS patterns are applied to the LTE-A user equipment and the relay node, a method for puncturing a resource element position (or symbol) to which data and/or RS for the other party is transmitted may be applied in the same manner as the aforementioned method 1 (for puncturing, nulling or rate matching of a physical resource element described in the present invention may be used).

In more detail, in downlink subframe configuration for the LTE-A user equipment, data and/or RS transmission for the LTE-A user equipment may be punctured at the resource element position (or symbol) to which the DMRS for the relay node is transmitted. Likewise, in downlink subframe configuration for the relay node, data and/or RS transmission for the relay node may be punctured at the resource element position (or symbol) to which the DMRS for the LTE-A user equipment is transmitted.

The base station may previously transmit information on puncturing (or rate matching) on downlink transmission performed by the base station to a downlink receiving entity (i.e., macro-user equipment or relay node) through upper layer signaling specifically for the downlink receiving entity or cell-specifically, whereby the respective downlink receiving entity may identify the puncturing status. In more detail, the base station may indicate to the macro-user equipments or the relay nodes within the base station that the relay node, which uses a DMRS pattern dedicated for the relay node, exists within the coverage of the base station, wherein the DMRS pattern is different from that used in the LTE-A downlink transmission mode for the macro-user equipments. This indication may be performed using upper layer signaling (for example, RRC signaling) user equipment-specifically, relay node-specifically, or cell-specifically, or may explicitly be signaled on the downlink channel allocation PDCCH DCI format. In addition, as to whether transmission from the base station to a specific relay node in a transmission mode less than 2 is performed or whether transmission from the base station to the specific relay node in a transmission mode more than rank 2 is performed, the corresponding transmission configuration information may be indicated to the corresponding relay node through relay node-specific upper layer signaling. Also, the corresponding transmission configuration information may be signaled to the macro-user equipments or other relay nodes within a cell through upper layer signaling user equipment-specifically, relay node-specifically, or cell-specifically.

Figure 17:
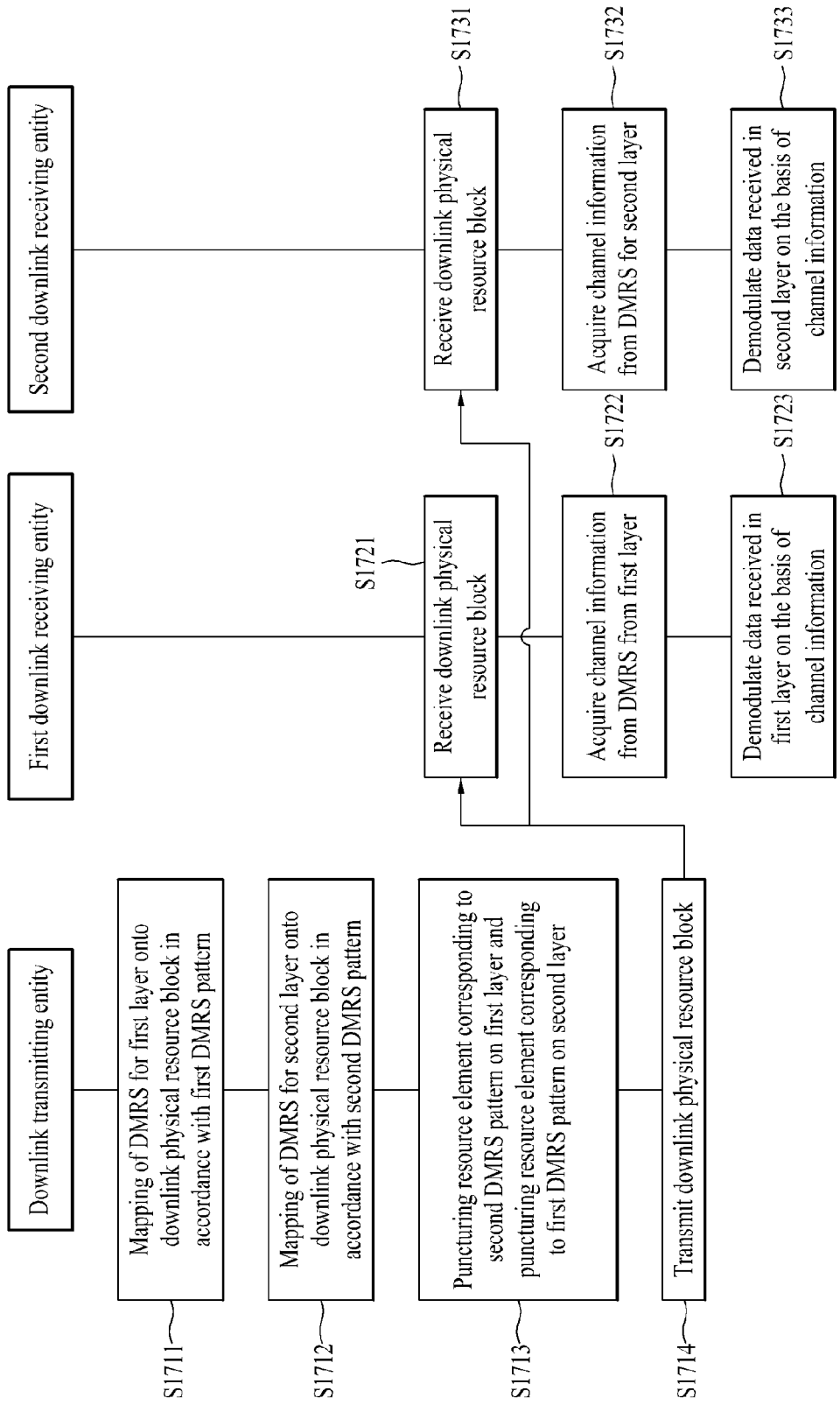
FIG. 17 is a diagram illustrating a method for transmitting and receiving a DMRS for downlink MU-MIMO transmission.

FIG. 17 is a diagram illustrating a method for transmitting and receiving a DMRS for downlink MU-MIMO transmission.

A downlink transmitting entity of FIG. 17 may be a macro base station or a relay node, for example. A first downlink receiving entity and a second downlink receiving entity may be macro-user equipments or relay nodes. The macro-user equipment may be an LTE release-8 user equipment, LTE release-9 user equipment or LTE-A user equipment. The first and second downlink receiving entities may be configured in pairs for downlink MU-MIMO transmission. In the method for transmitting and receiving a DMRS, which is described with reference to FIG. 17, it is assumed that the first and second downlink receiving entities receive downlink signals through first and second layers, respectively, and that different DMRS patterns are applied to the respective layers.

First of all, an operation of the downlink transmitting entity will be described.

At step S1711, the downlink transmitting entity may map a DMRS on a first layer for the first downlink receiving entity onto a downlink physical resource block (PRB) in accordance with a first DMRS pattern. At step S1712, the downlink transmitting entity may map a DMRS on a second layer for the second downlink receiving entity onto the same downlink physical resource block (PRB) in accordance with a second DMRS pattern. In other words, the first and second downlink receiving entities that perform MU-MIMO operation may receive the DMRS on each layer by sharing the same downlink PRB.

At step S1713, the downlink transmitting entity may map puncture a resource element corresponding to the second DMRS pattern on the first layer and a resource element corresponding to the first DMRS pattern on the second layer, in the downlink PRB shared by the first and second downlink receiving entities. Since the first and second DMRS patterns for the first and second downlink receiving entities are different from each other (i.e., since the DMRS for the first and second downlink receiving entities are arranged on different time/frequency positions on the same PRB), data transmission for the second (or first) downlink receiving entity may be prevented from causing interference with the DMRS for the first (or second) downlink receiving entity, and DMRS orthogonality may be maintained.

In this case, the resource elements punctured on the first and second layers may be those for data transmission or reference signal transmission on the first and second layers, respectively. Also, OFDM symbols that include resource elements corresponding to the second DMRS pattern on the first layer may be punctured, and OFDM symbols that include resource elements corresponding to the first DMRS pattern on the second layer may be punctured are Hereinafter, an operation of the first downlink receiving entity will be described.

The first downlink receiving entity may receive DMRS and data through the first layer. At step S1721, the first downlink receiving entity may receive the downlink PRB to which the DMRS for the first layer is mapped in accordance with the first DMRS pattern. At step S1722, the first downlink receiving entity may acquire channel information for the first layer through the received DMRS. At step S1723, the first downlink receiving entity may demodulate the data received through the first layer by using the acquired channel information. In this case, as described in the steps S1711 to S1713, since the resource element corresponding to the DMRS pattern for the first layer is punctured on the second layer of the downlink PRB received by the first downlink receiving entity, the first downlink receiving entity may receive the DMRS for the first layer without inter-layer interference.

The second downlink receiving entity may receive DMRS and data through the second layer. At step S1731, the second downlink receiving entity may receive the downlink PRB to which the DMRS for the second layer is mapped in accordance with the second DMRS pattern. At step S1732, the second downlink receiving entity may acquire channel information for the second layer through the received DMRS. At step S1733, the second downlink receiving entity may demodulate the data received through the second layer by using the acquired channel information. In this case, as described in the steps S1711 to S1713, since the resource element corresponding to the DMRS pattern for the second layer is punctured on the first layer of the downlink PRB received by the second downlink receiving entity, the second downlink receiving entity may receive the DMRS for the second layer without inter-layer interference.

Based on the suggestions of the present invention, the first downlink receiving entity and the second downlink receiving entity may be macro-user equipments or relay nodes. Otherwise, the first downlink receiving entity and the second downlink receiving entity may be a macro-user equipment and a relay node, respectively, or may be a relay node and a macro-user equipment, respectively.

For clarification of description, although the method according to one embodiment of the present invention, which is performed by the downlink transmitting entity (for example, base station) and the downlink receiving entities (user equipment or relay node), has been described with reference to FIG. 17, as its details and additional embodiments, the aforementioned various methods of the present invention may be applied to the present invention.

Figure 18:
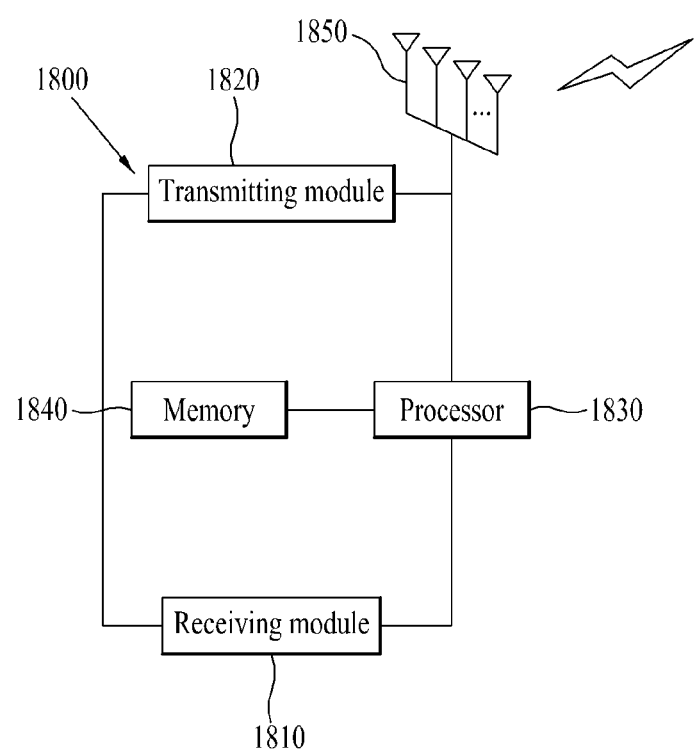
FIG. 18 is a diagram illustrating a preferred embodiment of a base station and a user equipment according to the embodiment of the present invention.

FIG. 18 is a diagram illustrating a preferred embodiment of a base station and a user equipment (or relay node) according to the embodiment of the present invention.

For description of FIG. 18, the description of the base station may equally be applied to the relay node as a downlink transmitting entity, and the description of the user equipment may equally be applied to the relay node as a downlink receiving entity.

Referring to FIG. 18, the base station 1800 according to the present invention may include a reception module 1810, a transmission module 1820, a processor 1830, a memory 1840, and a plurality of antennas 1850. The plurality of antennas may mean the base station that supports MIMO transmission and reception.

The reception module 1810 may receive various signals, data and information on an uplink (or backhaul uplink) from the user equipment (or relay node). The transmission module 1820 may transmit various signals, data and information on a downlink (or backhaul downlink) to the user equipment (or relay node). The processor 1830 may control the overall operation of the base station 1800.

The processor 1830 of the base station, which transmits DMRS for downlink MU-MIMO transmission, may be configured to map a DMRS for demodulation of first layer transmission for a first downlink receiving entity onto a downlink PRB in accordance with a first DMRS pattern and map a DMRS for demodulation of second layer transmission for a second downlink receiving entity onto the same downlink PRB in accordance with a second DMRS pattern. The processor 1830 may be configured to puncture a resource element corresponding to the second DMRS pattern on the first layer and a resource element corresponding to the first DMRS pattern on the second layer, in the downlink PRB. Also, the processor 1830 may be configured to transmit a downlink physical resource block through the transmission module 1820.

The description suggested in the aforementioned various methods of the present invention may be applied to details and additional configuration of the base station.

In the mean time, referring to FIG. 18, the user equipment 1800 according to the present invention may include a reception module 1810, a transmission module 1820, a processor 1830, a memory 1840, and a plurality of antennas 1850. The plurality of antennas may mean the user equipment that supports MIMO transmission and reception.

The reception module 1810 may receive various signals, data and information on a downlink (or access downlink) from the user equipment (or relay node). The transmission module 1820 may transmit various signals, data and information on an uplink (or access uplink) to the user equipment (or relay node). The processor 1830 may control the overall operation of the user equipment 1800.

The processor 1830 of the user equipment, which transmits DMRS for downlink MU-MIMO transmission, may be configured to receive a downlink PRB into which a DMRS for a first layer is mapped in accordance with a first DMRS pattern, acquire channel information for the first layer through the DMRS, and demodulate the data received through the first layer by using the acquired channel information. In this case, a DMRS for demodulation of second layer transmission for another user equipment is further mapped onto the downlink PRB in accordance with a second DMRS pattern, wherein the user equipment and another user equipment constitute MU-MIMO pair. A resource element corresponding to the second DMRS pattern on the first layer and a resource element corresponding to the first DMRS pattern on the second layer may be punctured.

In addition, the base station or the processor of the user equipment may perform an operation processing function of information received by the base station or the user equipment and information to be transmitted externally. The memory 1840 may store the operation processed information for a predetermined time period, and may be replaced with an element such as a buffer (not shown).

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention may be applied to various mobile communication systems.

The invention claimed is:

1. A method, for a base station, for transmitting a demodulation reference signal (DMRS) for downlink multi-user multiple input multiple output (MIMO) transmission, the method comprising:
    mapping, by the base station, a DMRS for a first layer on a downlink physical resource block in accordance with a first DMRS pattern;
    mapping, by the base station, a DMRS for a second layer on the downlink physical resource block in accordance with a second DMRS pattern, wherein the second DMRS pattern is different from the first DMRS pattern in time and frequency positions; and
    transmitting, by the base station, the DMRS for the first layer and the DMRS for the second layer mapped on the downlink physical resource block,
    wherein, in the downlink physical resource block, for a transmission on the first layer, a data transmission of the first layer uses resource elements other than resource elements corresponding to the second DMRS pattern and no signal of the first layer is transmitted on the resource elements corresponding to the second DMRS pattern,
    wherein, in the downlink physical resource block, for a transmission on the second layer, a data transmission of the second layer uses resource elements other than resource elements corresponding to the first DMRS pattern and no signal of the second layer is transmitted on the resource elements corresponding to the first DMRS pattern,
    wherein the transmissions on the first and second layers are transmitted to a first different user equipment (UE) and a second UE, respectively, and
    wherein the first UE does not perform demodulations on the resource elements corresponding to the second DMRS pattern, and the second UE does not perform demodulations on the resource elements corresponding to the first DMRS pattern.

2. The method according to claim 1, wherein the UEs are configured in pairs for the downlink multi-user MIMO transmission.

3. The method according to claim 1, wherein, in the downlink physical resource block, an OFDM symbol that includes the resource element corresponding to the second DMRS pattern is punctured for transmissions on the first layer, and OFDM symbol that includes the resource element corresponding to the first DMRS pattern is punctured for transmissions on the second layer.

4. A method, for a user equipment (UE), for receiving a demodulation reference signal (DMRS) for downlink multi-user multiple input multiple output (MIMO) transmission, the method comprising:
    receiving, by the UE, a DMRS for a first layer mapped in a downlink physical resource block in accordance with a first DMRS pattern; and
    demodulating, by the UE, data received through the first layer by using channel information acquired from the DMRS for the first layer,
    wherein a DMRS for a second layer is further mapped on the downlink physical resource block in accordance with a second DMRS pattern,
    wherein the second DMRS pattern is different from the first DMRS pattern in time and frequency positions,
    wherein, in the downlink physical resource block, for a transmission on the first layer, a data transmission of the first layer uses resource elements other than resource elements corresponding to the second DMRS pattern and no signal of the first layer is transmitted on the resource elements corresponding to the second DMRS pattern,
    wherein, in the downlink physical resource block, for a transmission on the second layer, a data transmission of the second layer uses resource elements other than resource elements corresponding to the first DMRS pattern and no signal of the second layer is transmitted on the resource elements corresponding to the first DMRS pattern,
    wherein the transmissions on the first and second layers are transmitted to a first user equipment (UE) and a second UE, respectively, and
    wherein the first UE does not perform demodulations on the resource elements corresponding to the second DMRS pattern, and the second UE does not perform demodulations on the resource elements corresponding to the first DMRS pattern.

5. The method according to claim 4, wherein the different UEs are configured in pairs for the downlink multi-user MIMO transmission.

6. The method according to claim 4, wherein, in the downlink physical resource block, OFDM symbol that includes the resource element corresponding to the second DMRS pattern is punctured for transmissions on the first layer, and OFDM symbol that includes the resource element corresponding to the first DMRS pattern is punctured for transmission on the second layer.

7. A base station for transmitting a demodulation reference signal (DMRS) for downlink transmission, the base station comprising:
    a reception module receiving an uplink signal from a user equipment;
    a transmission module transmitting a downlink signal to the user equipment; and
    a processor connected to the reception module and the transmission module, controlling the base station that includes the reception module and the transmission module,
    wherein the processor is configured to:
    map a DMRS for a first layer on a downlink physical resource block in accordance with a first DMRS pattern,
    map a DMRS for a second layer on the downlink physical resource block in accordance with a second DMRS pattern,
    wherein the second DMRS pattern is different from the first DMRS pattern in time and frequency positions, and
    transmit the DMRS for the first layer and the DMRS for the second layer mapped on the downlink physical resource block through the transmission module,
    wherein, in the downlink physical resource block, for a transmission on the first layer, a data transmission of the first layer uses resource elements other than resource elements corresponding to the second DMRS pattern and no signal of the first layer is transmitted on the resource elements corresponding to the second DMRS pattern,
    wherein, in the downlink physical resource block, for a transmission on the second layer, a data transmission of the second layer uses resource elements other than resource elements corresponding to the first DMRS pattern and no signal of the second layer is transmitted on the resource elements corresponding to the first DMRS pattern,
    wherein the transmissions on the first and second layers are transmitted to a first user equipment (UE) and a second UE, respectively, and
    wherein the first UE does not perform demodulations on the resource elements corresponding to the second DMRS pattern, and the second UE does not perform demodulations on the resource elements corresponding to the first DMRS pattern.

8. A user equipment (UE) for receiving a demodulation reference signal (DMRS) for downlink transmission, the UE comprising:
    a reception module receiving a downlink signal from a base station;
    a transmission module transmitting an uplink signal to the base station; and
    a processor connected to the reception module and the transmission module, controlling the UE that includes the reception module and the transmission module,
    wherein the processor is configured to:
    receive, through the reception module, a DMRS for a first layer mapped in a downlink physical resource block in accordance with a first DMRS pattern, and
    demodulate data received through the first layer by using channel information acquired from the DMRS for the first layer,
    wherein a DMRS for a second layer is further mapped on the downlink physical resource block in accordance with a second DMRS pattern,
    wherein the second DMRS pattern is different from the first DMRS pattern in time and frequency positions,
    wherein, in the downlink physical resource block, for a transmission on the first layer, a data transmission of the first layer uses resource elements other than resource elements corresponding to the second DMRS pattern and no signal of the first layer is transmitted on the resource elements corresponding to the second DMRS pattern,
    wherein, in the downlink physical resource block, for a transmission on the second layer, a data transmission of the second layer uses resource elements other than resource elements corresponding to the first DMRS pattern and no signal of the second layer is transmitted on the resource elements corresponding to the first DMRS pattern, wherein the transmissions on the first and second layers are transmitted to a first user equipment (UE) and a second UE, respectively, and wherein the first UE does not perform demodulations on the resource elements corresponding to the second DMRS pattern, and the second UE does not perform demodulations on the resource elements corresponding to the first DMRS pattern.

* * * * *